(12) United States Patent
Hettinger et al.

(10) Patent No.: US 10,316,742 B2
(45) Date of Patent: Jun. 11, 2019

(54) TURBOCHARGER ASSEMBLY

(71) Applicants: Garrett Transportation I Inc., Torrance, CA (US); BMW AG, Munich (DE)

(72) Inventors: Raphaël Hettinger, La Baffe (FR); Fréderic Daguin, Epinal (FR); Raphaël Boileau, Thaon-les-Vosges (FR); Magali Capelli, Deyvilliers (FR); Pascal Simon, Chavelot (FR); Nicolas Gaineton, Deyvilliers (FR); Erich Blumenschein, Sierning (AT); Raphael Hofer, Garsten (AT); Michael Reichhart, Garsten (AT); Georg Risch, Steyr (AT); Lorenz Steinwender, Linz (AT); Florian Grün, Linz (AT); István Gódor, Leoben (AT)

(73) Assignees: Garrett Transportation I Inc., Torrance, CA (US); BMW AG, Munich (DE)

( * ) Notice: Subject to any disclaimer, the term of this patent is extended or adjusted under 35 U.S.C. 154(b) by 434 days.

(21) Appl. No.: 15/154,673

(22) Filed: May 13, 2016

(65) Prior Publication Data
US 2017/0328273 A1   Nov. 16, 2017

(51) Int. Cl.
*F02B 33/40* (2006.01)
*F02B 39/14* (2006.01)
(Continued)

(52) U.S. Cl.
CPC ............ *F02B 39/14* (2013.01); *F01D 25/125* (2013.01); *F01D 25/16* (2013.01); *F01D 25/164* (2013.01);
(Continued)

(58) Field of Classification Search
CPC ...... F01D 25/125; F01D 25/16; F01D 25/164; F01D 25/168; F01D 25/183; F01D 25/186; F02B 39/14
See application file for complete search history.

(56) References Cited

U.S. PATENT DOCUMENTS 3,411,706 A * 11/1968 Woollenweber, Jr. ...................... F01D 25/166
417/407
4,364,717 A * 12/1982 Schippers ............. F01D 25/125
415/180

(Continued)

FOREIGN PATENT DOCUMENTS

| EP | 2 500 544 A1 | 9/2012 | |
| GB | 2 039 632 A | 8/1980 | |
| GB | 2039632 A * | 8/1980 | ............. F01D 25/12 |

OTHER PUBLICATIONS

EP Application No. 17166958.3-1607, Extended European Search Report, dated Oct. 5, 2017 (7 pages).

*Primary Examiner* — Woody A Lee, Jr.
(74) *Attorney, Agent, or Firm* — Brian J. Pangrle

(57) ABSTRACT

A turbocharger system can include a housing that includes a through bore, a plurality of lubricant bores, a plurality of lubricant bore to through bore openings and a recessed compressor-side surface that defines in part a passage that fluidly couples at least two of the lubricant bores; a rolling element bearing unit disposed at least in part in the through bore of the housing; and, a plate that covers at least a portion of the recessed compressor-side surface of the housing.

20 Claims, 18 Drawing Sheets

(51) Int. Cl.

| | |
|---|---|
| *F01D 25/12* | (2006.01) |
| *F01D 25/16* | (2006.01) |
| *F01D 25/18* | (2006.01) |
| *F01D 25/24* | (2006.01) |
| *F02C 6/12* | (2006.01) |
| *F16C 33/66* | (2006.01) |
| *F16C 19/18* | (2006.01) |
| *F16C 33/58* | (2006.01) |
| *F16C 35/04* | (2006.01) |

(52) U.S. Cl.
CPC ......... *F01D 25/168* (2013.01); *F01D 25/183* (2013.01); *F01D 25/186* (2013.01); *F01D 25/24* (2013.01); *F02B 33/40* (2013.01); *F02C 6/12* (2013.01); *F16C 19/184* (2013.01); *F16C 33/586* (2013.01); *F16C 33/66* (2013.01); *F16C 33/6659* (2013.01); *F16C 35/042* (2013.01); *F05D 2220/40* (2013.01); *F05D 2240/53* (2013.01); *F05D 2240/54* (2013.01); *F16C 2360/24* (2013.01)

(56) References Cited

U.S. PATENT DOCUMENTS

| | | | |
|---|---|---|---|
| 4,655,043 A | 4/1987 | McInerney | |
| 5,890,881 A * | 4/1999 | Adeff | F01D 25/145 |
| | | | 415/111 |
| 8,353,158 B2 * | 1/2013 | Purdey | F01D 25/166 |
| | | | 415/110 |
| 9,046,036 B2 * | 6/2015 | Petitjean | F01D 25/16 |

* cited by examiner

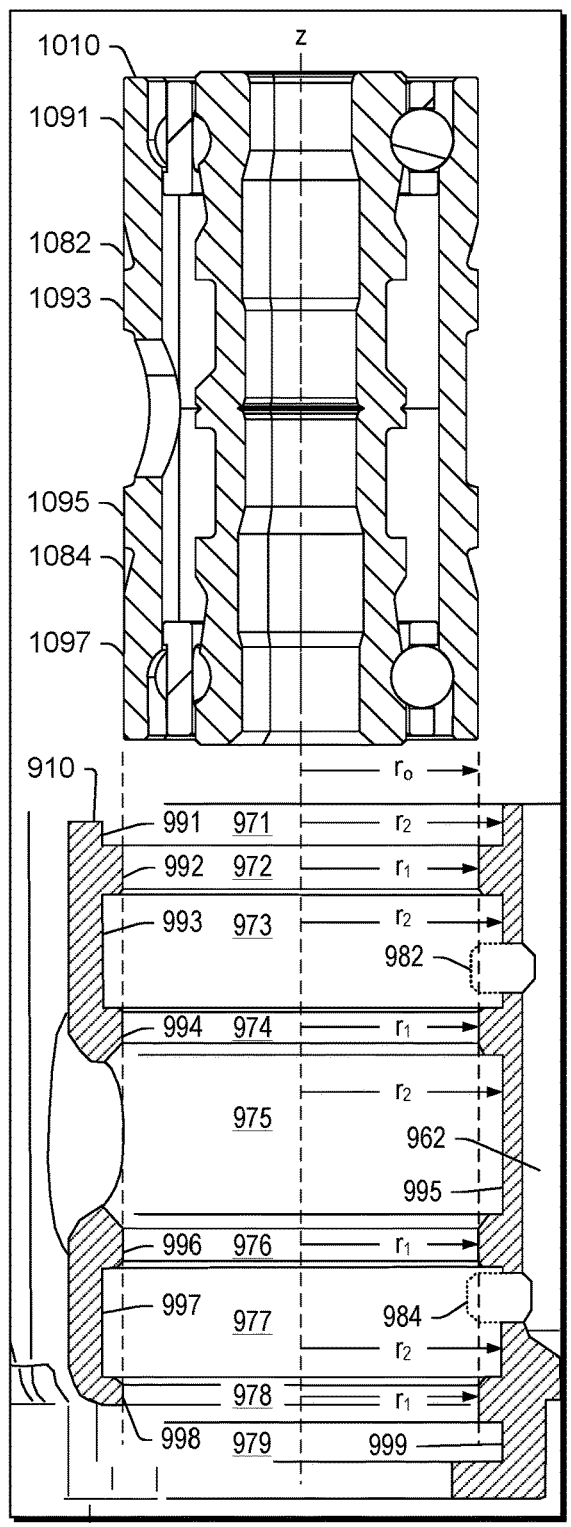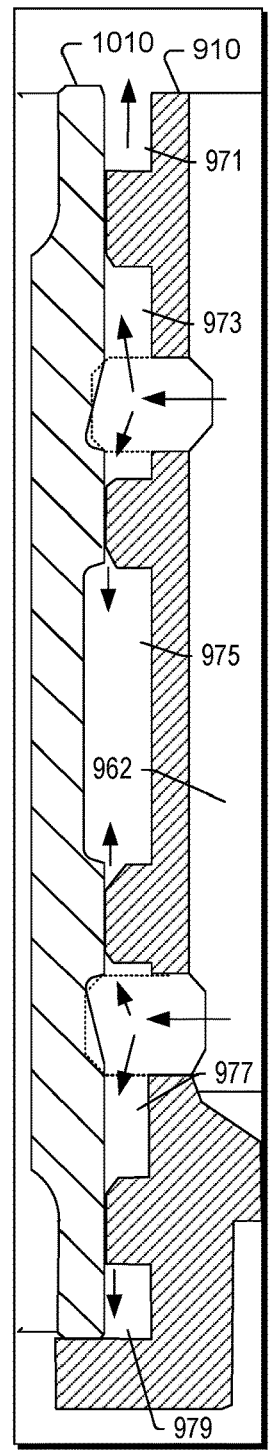
Fig. 10A
Fig. 10B

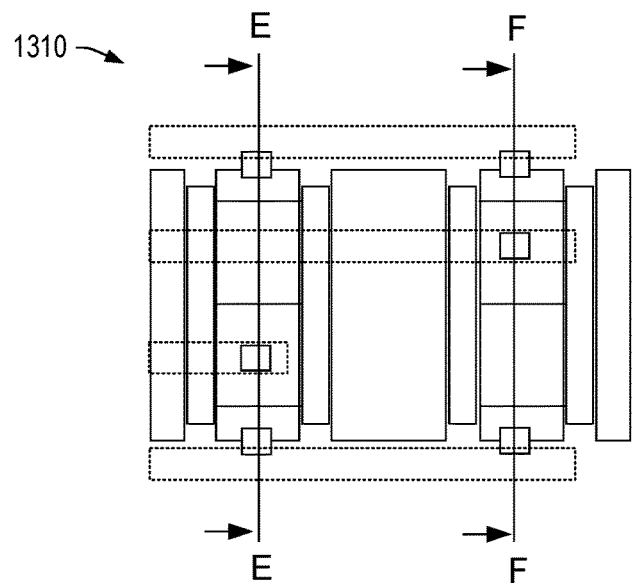
Fig. 13A
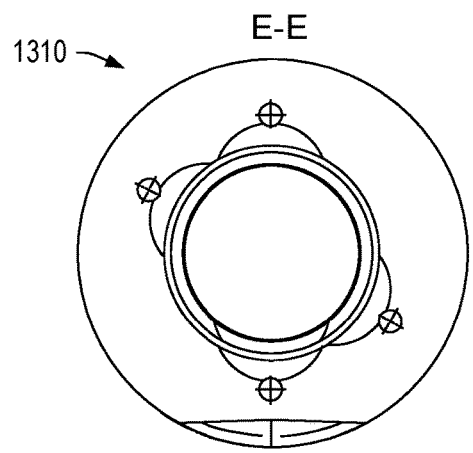 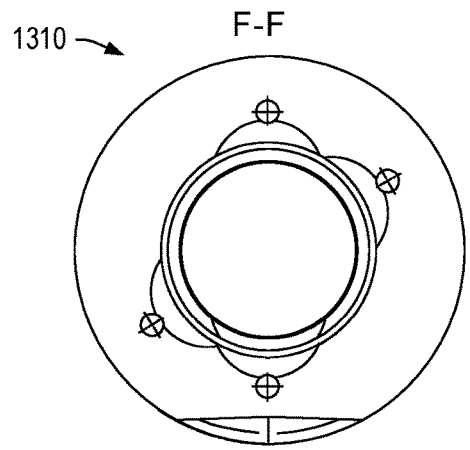
Fig. 13B        Fig. 13C

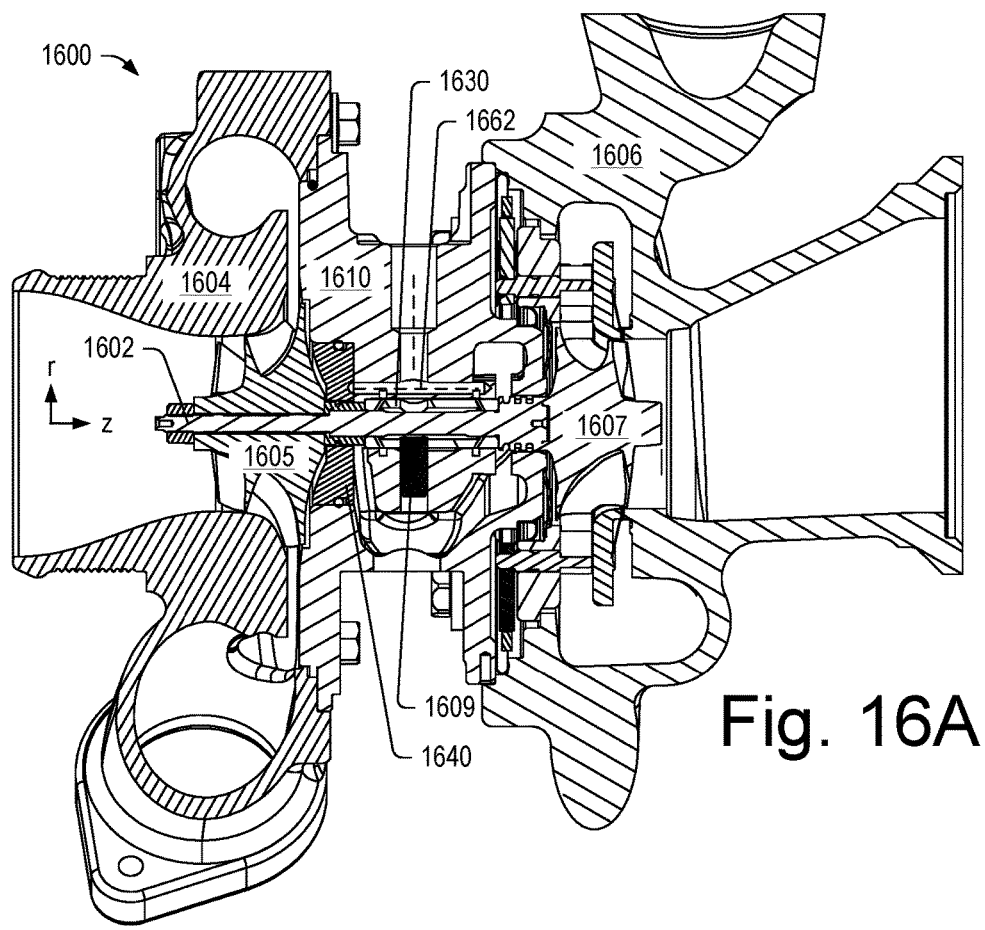
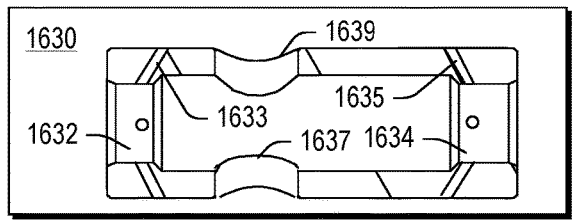
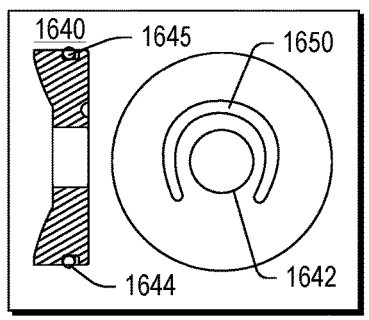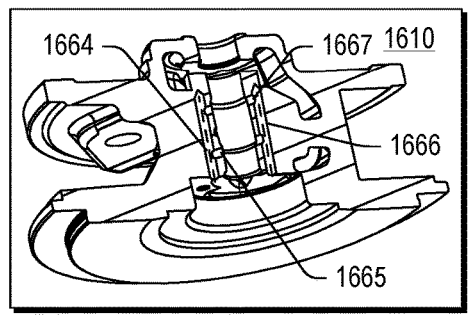
Fig. 16A
Fig. 16B
Fig. 16C
Fig. 16D

TURBOCHARGER ASSEMBLY

TECHNICAL FIELD

Subject matter disclosed herein relates generally to turbocharger assemblies or systems.

BACKGROUND

A turbocharger center housing rotating assembly (CHRA) can include a turbine wheel and a compressor wheel attached to a shaft rotatably supported by a ball bearing assembly located in a bore of a center housing. As an example, a rolling element bearing assembly (e.g., or REB cartridge) can include an outer race and an inner race, configured to receive a shaft, where the outer race and the inner race are separated by rolling elements (e.g., balls, rollers, etc.). As another example, a shaft may be configured as an inner race, for example, where rolling elements directly contact the shaft. As an example, a journal bearing can include inner journal surfaces that are spaced an axial distance apart where one inner journal surface may be a compressor side inner journal surface and where another inner journal surface may be a turbine side inner journal surface. In such an example, clearances can exist between an outer surface or surfaces of a shaft and the inner journal surfaces where lubricant may flow to such clearances. In such an example, the journal bearing can support rotation of the shaft where the journal bearing may be rotatable or non-rotatable (e.g., limited in its rotation via an anti-rotation mechanism).

During operation of a turbocharger, lubricant is supplied to a CHRA to lubricate various components and, for example, to act as a medium that can transfer heat energy. An adequate supply of lubricant (e.g., oil, etc.) can help to ensure performance over an expected operational lifetime.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 10A and 10B are a series of views of a portion of the system of FIG. 9;

FIGS. 11A, 11B and 110 are a series of cross-sectional views of examples of a housing;

FIGS. 13A, 13B and 13C are a series of views of an example of a housing;

FIGS. 16A, 16B, 16C and 16D are a series of views of an example of a system.

DETAILED DESCRIPTION

Figure 1:
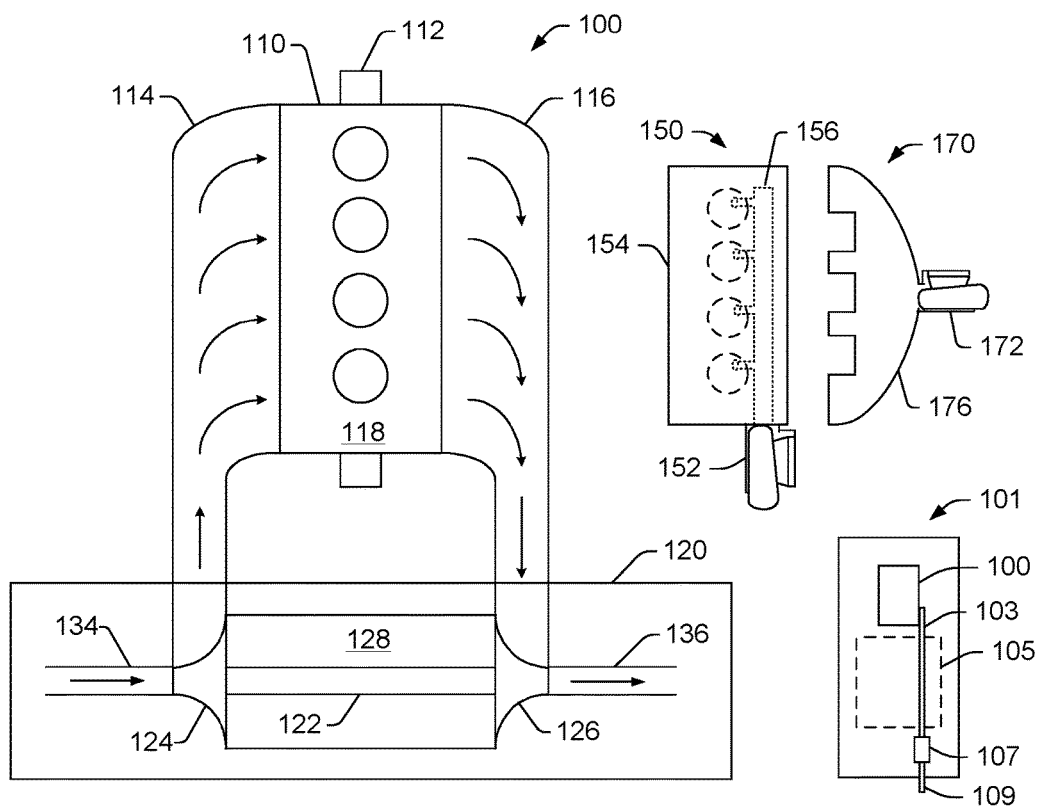
FIG. 1 is a diagram of a turbocharger and an internal combustion engine along with a controller.
Figure 1:
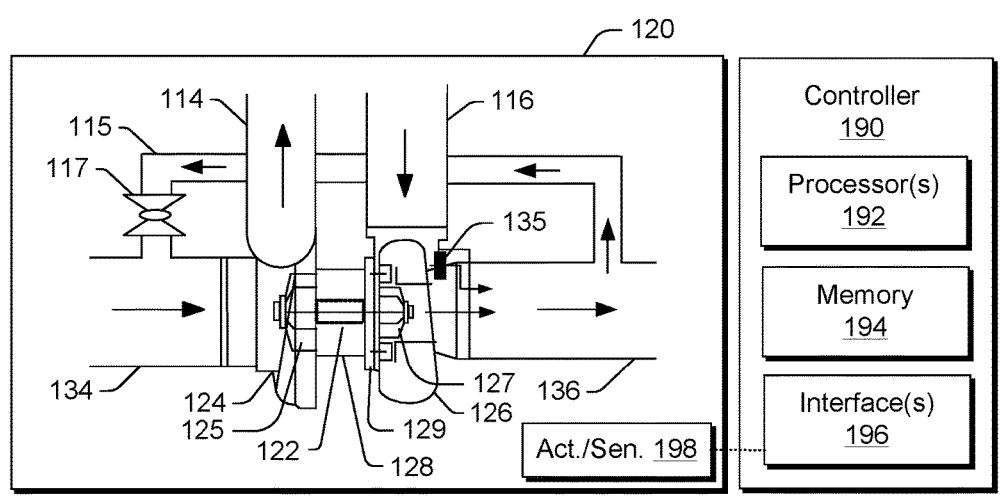

During operation of a turbocharger, a bearing assembly (e.g., a rolling element bearing assembly, etc.) may be exposed to imbalance forces, thrust forces, etc. Such forces can cause one or more surfaces of a bearing assembly to wear, which, in turn, may decrease performance, lead to failure, etc.

One or more balancing processes that aim to minimize imbalance may be performed on components of a turbocharger. For example, individual components may be balanced using a low rotational speed process while assemblies (e.g., center housing rotating assemblies or CHRAs) may be balanced using a higher rotational speed process. However, over the lifetime of a turbocharger, various phenomena can lead to imbalance (e.g., wear, coking, etc.).

As to thrust forces, these may arise during operational transients such as changes in demand, changes in geometry of a variable geometry turbine unit or compressor unit, etc. Operational transients may generate axial thrust forces that accelerate wear as components in a ball bearing assembly come closer together, for example, squeezing out or otherwise thinning lubricant film thickness between such components.

As with most types of machinery, a manufacturer may recommend inspection, servicing, replacement, etc. of a turbocharger, or one or more components therein, based on, for example, hours of use. However, from time-to-time, a turbocharger may fail even though such recommendations have been followed. Unexpected failure of a turbocharger can lead to unplanned downtime of equipment that relies on the turbocharger, which may have associated costs.

As an example, a bearing assembly may form lubricant films, which may act as squeeze films or squeeze film dampers (SFDs). A squeeze film damper may provide viscous damping in a turbocharger. As an example, a squeeze film damper may provide structural isolation, reduce amplitudes of rotor response to imbalance, assist to suppress rotordynamic instability, etc. During operation, hydrodynamic squeeze film pressures can exert reaction forces that can help to attenuate transmitted forces and to reduce component amplitude.

For a particular application, one or more SFDs may be formed that aim to provide a desired amount of damping. Damping may be defined as being large, for example, where a SFD acts as a rigid constraint to a rotor-bearing system (e.g., forces transmitted to supporting structure) or as being light, for example, where it may permit amplitudes of vibratory motion with likely subsynchronous motions. As an example, a SFD may be characterized as being soft, for example, where it allows for motion at a location of a support (e.g., as to one or more modes of vibration of interest).

A SFD may be characterized by various parameters such as, for example, damper geometry (e.g., length, diameter and clearance), operating speed and fluid properties (e.g., density and viscosity). Some factors that may affect performance of a SFD can include kinematics (e.g., as tied to rotor system and acting forces), level of lubricant/fluid supply pressure for adequate flow rate and cooling, feeding and end sealing mechanisms, fluid inertia effects, etc.

As an example, a SFD may be modeled using a mathematical damping model. Such a model may include equations associated with elements. For example, a SFD may be modeled as a viscous element such as a dashpot.

Damping may be described as influencing an oscillatory system to reduce, restrict, and/or prevent oscillations. A system may be characterized with respect to damping, for example, consider overdamped, critically damped, underdamped, or undamped. As an example, a system may be modeled as a mass-spring-damper system with mass m, spring constant k, and viscous damper of damping coefficient c. Such a system may be subjected to an oscillatory force and/or a damping force.

As an example, a bearing assembly or a unitary journal bearing may be disposed within a bore of a housing. In such an example, the housing may be part of a turbocharger such as, for example, a center housing or bearing housing of a turbocharger, which may be a cast housing (e.g., metal or alloy) or, for example, a multi-piece housing (e.g., made of cast pieces, etc.). As an example, a shaft may be supported at least in part via a bearing assembly that includes surfaces that can form SFDs. In such an example, the shaft may be fit to an inner race or inner races of a rolling element bearing assembly or assemblies. Such a shaft may be part of a "shaft and wheel assembly" (SWA) where the wheel is a turbine wheel (e.g., welded to the shaft) and where a compressor wheel may be fit via a free end of the shaft.

Below, an example of a turbocharged engine system is described followed by various examples of components, assemblies, methods, etc.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system (e.g., journal bearing(s), rolling element bearing(s), etc.) disposed in the housing 128 (e.g., a bore defined by one or more bore walls) such that rotation of the turbine wheel 127 causes rotation of the compressor wheel 125 (e.g., as rotatably coupled by the shaft 122).

In the example of FIG. 1, a variable geometry assembly 129 is shown as being, in part, disposed between the housing 128 and the housing 126. Such an assembly may include vanes or other components to vary geometry of passages that lead to a turbine wheel space in the turbine housing 126. As an example, a variable geometry compressor unit may be provided.

In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126. Further, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages within to direct exhaust from cylinders to the turbine housing 152 while in the arrangement 170, a manifold 176 provides for mounting of the housing 172, for example, without any separate, intermediate length of exhaust piping. In the example arrangements 150 and 170, the turbine housings 152 and 172 may be configured for use with a variable geometry assembly such as the assembly 129 or, for example, other assemblies described herein.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., hours of service, turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc. As an example, the controller 190 may be configured to perform a method associated with a rolling element bearing unit/assembly, for example, a method that can issue a notification responsive to generated noise, vibration, temperature, lubricant flow, etc.

As an example, a system may include one or more actuators and/or one or more sensors 198. In such an example, the interface 196 of the controller 190 may receive signals of one or more sensors and/or transmit signals to one or more actuators. The controller 190 may implement control logic, for example, based at least in part on a signal to output a control signal (e.g., to one or more actuators, notification mechanisms, etc.).

Exhaust driven turbochargers can include a rotating shaft carrying a turbine wheel and a compressor wheel where the shaft may be rotatably supported within a center housing (e.g., intermediate a compressor and a turbine) by one or more lubricated bearings (e.g., oil lubricated). During operation, exhaust from an internal combustion engine can be directed via one or more conduits, passages, etc., to drive a turbocharger's turbine wheel, which, in turn, drives a compressor wheel to boost charge air to the internal combustion engine.

During operation, a turbocharger's rotating assembly may reach rotational speeds in excess of 100,000 rpm (e.g., some may reach rotational speeds of 250,000 rpm or more). To handle such high speeds, a turbocharger's center housing rotating assembly (CHRA) requires balance and adequate lubrication. Factors such as noise, vibration and harshness (NVH), as well as efficiency, are often interrelated and must be within acceptable limits.

As to operational temperatures, consider as an example a diesel engine with exhaust that may be at about 860 degrees C. and consider as an example a gasoline engine with exhaust that may be at about 1050 degrees C. Exhaust gas can cause heating of various components of a CHRA, including bearings, etc., and heat energy may be transferred to lubricant that flows through a CHRA. As an example of interrelatedness, vibration can generate noise and reduce efficiency while heat energy, particularly with respect to cycling, may cause wear, changes to one or more clearances, etc. Heat energy may also act to alter chemical structure of a lubricant, for example, depending on type of lubricant (e.g., consider hydrocarbon coking, etc.). Under dynamic conditions, such as an increase in exhaust flow, axial thrust forces can cause contact between various CHRA components. Contact can cause wear, which, in turn, can alter balance, leading to increased noise, vibration, etc., and reduced efficiency. Factors such as noise, vibration, wear, etc. may lead to failure of one or more components of a turbocharger.

Turbocharger bearing systems may offer both support and damping to control motion of a turbocharger shaft, for example, to help isolate vibrations from rotating parts while allowing the turbocharger shaft to spin, for example, at speeds that may be about 60 times faster than a maximum engine speed (e.g., consider a diesel engine). A turbocharger bearing system may help ensure turbocharger operational efficiency by keeping frictional losses and NVH low such that energy from the engine exhaust gas is available to drive the turbocharger. Where operational conditions may vary, a turbocharger bearing system may be selected to help balance low-power losses with an ability to control forces applied by varying mechanical loading (e.g., thrust and other forces).

As to turbocharger bearing system hydrodynamics, fluid (e.g., oil or other lubricant) may lubricate components and also influence motion of a turbocharger shaft. As an example, a "fully-floating" bearing system can include a journal bearing that supports a shaft using an outer film disposed between a bore wall of a center housing and an outer surface of the journal bearing and an inner film disposed between an inner surface of the journal bearing and an outer surface of the shaft. In such an example, the journal bearing may rotate (azimuthally) at approximately one-half the speed of the shaft and move axially and radially (i.e., the journal bearing is fully-floating).

As to a "semi-floating" approach, an anti-rotation mechanism may act to limit rotation (azimuthally) of a journal bearing or, for example, an outer race of a rotating element bearing (REB) assembly. As an example, a semi-floating journal bearing or a semi-floating REB assembly may support a shaft using, in part, an outer oil film disposed between an outer surface of the journal bearing or an outer surface of the REB assembly and a bore wall of a center housing where the outer oil film acts as a squeeze film (SFD), for example, to damp undesirably shaft motions.

As an example, a turbocharger may include one or more rolling element bearing (REB) assemblies or units, which may be, for example, one or more ball bearing assemblies. An REB assembly can include an outer race, an inner race and rolling elements disposed between the inner and outer races (e.g., in a raceway or raceways). For example, consider an REB assembly that includes a unitary outer race and a two-piece inner race fit to a turbocharger shaft (e.g., a shaft and wheel assembly (SWA) where rolling elements allow for rotation of the shaft and two-piece inner race with respect to the outer race). In such an example, the outer race of the REB assembly may be "located" in a bore of a housing such as a center housing (e.g., disposed between a compressor housing and a turbine housing). As an example, to axially locate an outer race in a bore of a center housing, a counter-bore and a plate may be positioned at a turbine side and a compressor side of the center housing where each forms an opening with a diameter less than an outer diameter of the outer race. In such an example, the REB assembly (e.g., unit or units) may be placed in the bore followed by receipt of a shaft (e.g., a SWA) or, for example, the REB assembly may be fit to the shaft (e.g., a SWA) and then inserted into the bore (e.g., as a unit that includes the REB assembly and the shaft). Further, an anti-rotation mechanism may be provided that locates the outer race in the bore of the center housing by limiting rotation of the outer race (e.g., azimuthal direction). In such an example, the REB assembly may be "semi-floating", for example, having an ability to move in a radial direction where radial clearances between an outer surface of the outer race and a bore surface of the center housing provide for squeeze film formation (e.g., one or more lubricant films).

As an example, a turbocharger can include a journal bearing, which may be a unitary journal bearing that includes a plurality of inner journal surfaces to support rotation of a shaft operatively coupled to a turbine wheel and a compressor wheel.

Figure 2:
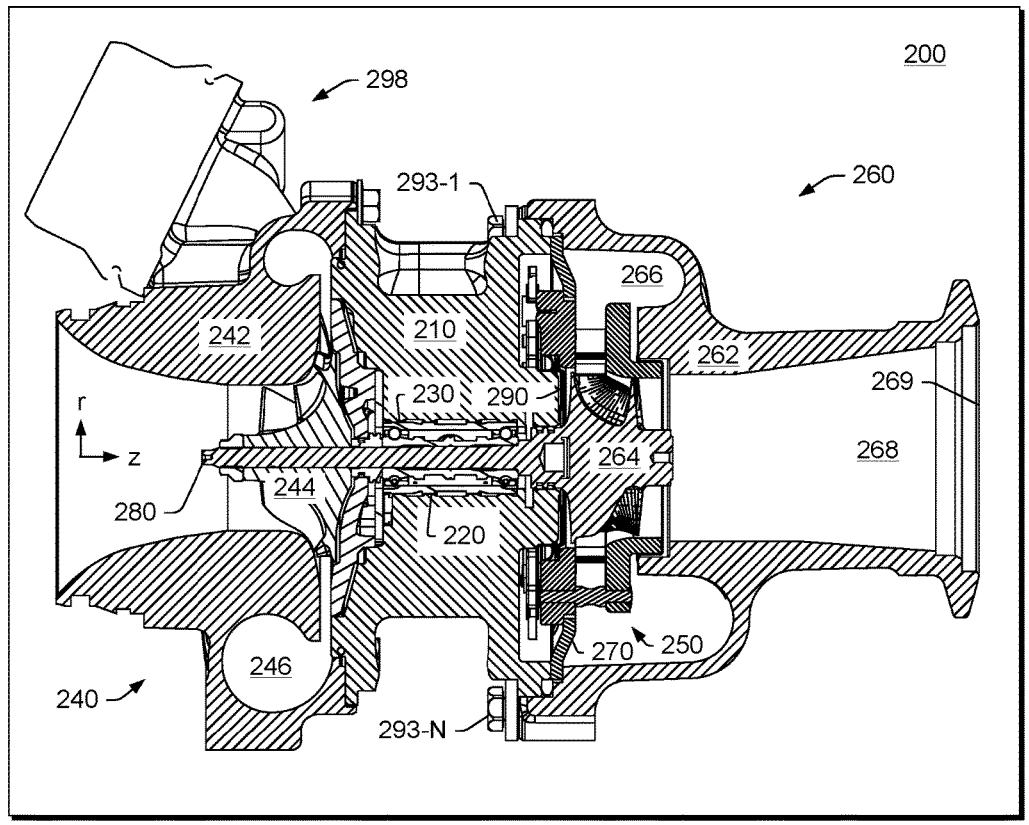
FIG. 2 is a cross-sectional view of an example of a turbocharger assembly.

FIG. 2 shows an example of a turbocharger assembly 200 that includes a ball bearing assembly 220 (e.g., a ball bearing cartridge or unit or rolling element bearing unit) disposed in a bore 230 (e.g., a through bore defined by one or more bore walls) of a housing 210 between a compressor assembly 240 and a turbine assembly 260 where the ball bearing assembly 220 supports a shaft 280. In the example of FIG. 2, the compressor assembly 240 includes a compressor housing 242 that defines a volute 246 and that houses a compressor wheel 244 and the turbine assembly 260 includes a turbine housing 262 that defines a volute 266 and that houses a turbine wheel 264. The turbine wheel 264 may be, for example, welded or otherwise attached to the shaft 280 to form a shaft and wheel assembly (SWA) where a free end of the shaft 280 allows for attachment of the compressor wheel 244.

In the example of FIG. 2, the turbine assembly 260 further includes a variable geometry assembly 250 (e.g., a VGT or VNT cartridge or unit) that is positioned using a flange 270 (e.g., optionally shaped as a stepped annular disc) that clamps between the housing 210 and the turbine housing 262, for example, using bolts 293-1 to 293-N and a heat shield 290 (e.g., optionally shaped as a stepped annular disc), the latter of which is disposed between the cartridge 250 and the housing 280.

As to exhaust flow, higher pressure exhaust in the volute 266 passes through passages of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). The exhaust may then flow to an exhaust system, which may optionally include one or more emissions components, etc. and then to an external environment (e.g., at atmospheric pressure).

During operation of the turbocharger assembly 200, adjustments to geometry of the variable geometry assembly 250 may generate thrust forces, which may, for example, cause shifts in clearances between one or more components. As an example, a test regimen may be performed by adjusting geometry of a variable geometry assembly 250, for example, to cause a shift in clearances, positions, etc. of one or more components of the ball bearing assembly 220. In such an example, the test regimen may test a notification mechanism of the ball bearing assembly 220.

In FIG. 2, as well as in other figures, various components may be described, for example, with respect to a cylindrical coordinate system (e.g., or systems) having radial, axial and azimuthal coordinates r, z and Θ, respectively.

Figure 3:
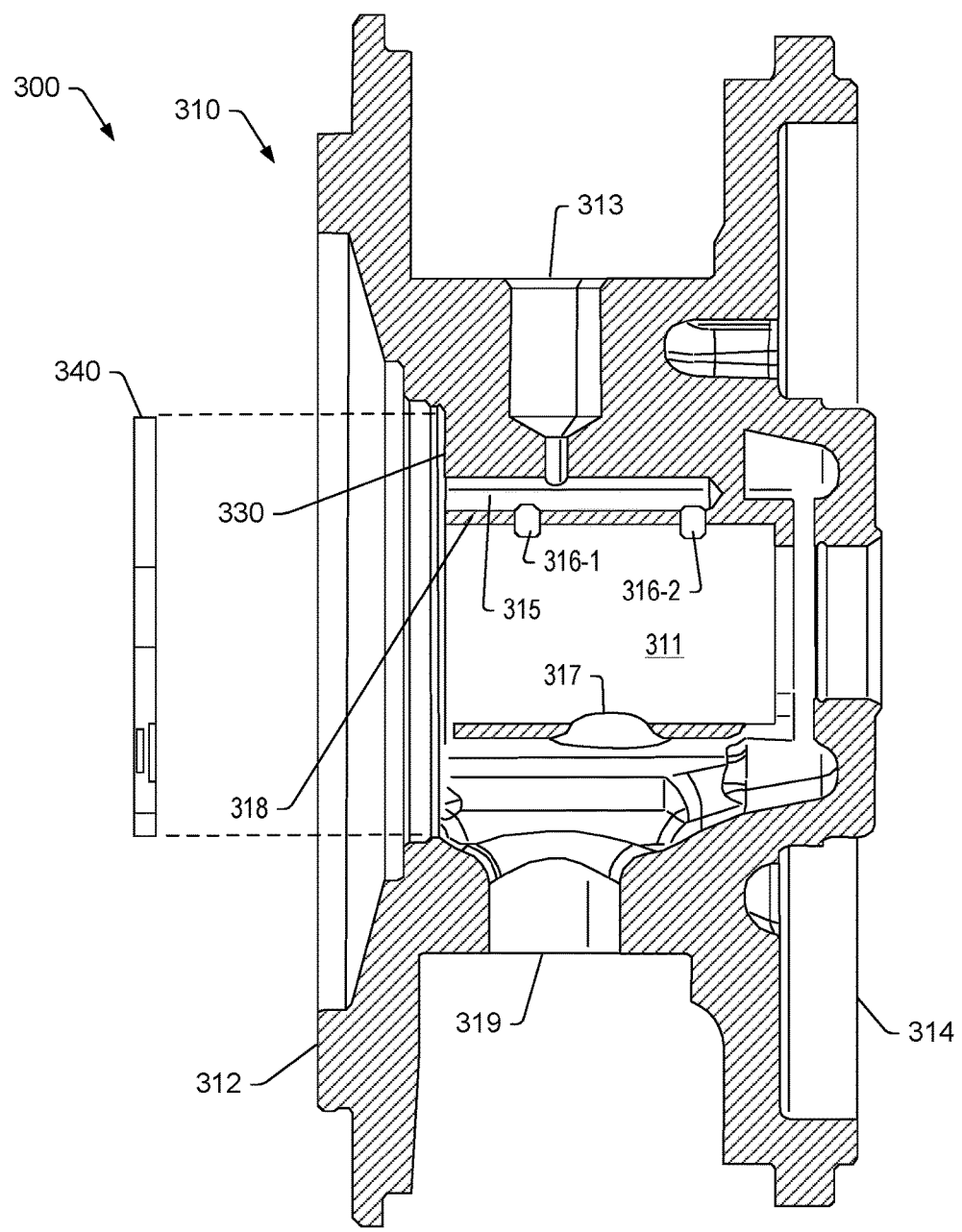
FIG. 3 is a view of an example of a system.

FIG. 3 is a view of an example of a housing assembly 300 that includes a housing 310 and an end plate 340. In such an example, the end plate 340 may seat adjacent to a recessed surface, for example, at least in part to cover a locating feature such as a locating washer, where such a locating mechanism may be included as part of a turbocharger. As an example, the end plate 340 may act to plug a lubricant passage of a housing, optionally via one or more seal components (e.g., O-ring, plug, etc.).

In the example of FIG. 3, the housing 310 (e.g., a bearing housing or center housing) includes a compressor side 312 and a turbine side 314 and a lubricant inlet 313 and a lubricant outlet 319 disposed between the sides 312 and 314 where the inlet 313 and the outlet 319 may optionally be opposite each other. As an example, at least the outlet 319 may optionally be substantially aligned with respect to gravity, for example, to allow for drainage of lubricant therefrom at least in part due to gravity.

The housing 310 also includes a bore 311 with ports 316-1 and 316-2 that are in fluid communication with a passage 315 that is in fluid communication with the inlet 313. The passage 315 may optionally be sealed at the compressor side 312 (e.g., via a plug, a plate, etc.). Such a passage may be drilled or otherwise formed in a housing, for example, by drilling into a housing from a compressor side to an appropriate axial depth.

In the example of FIG. 3, the bore 311 is defined at least in part by a bore wall 318, which includes a radial thickness between the passage 315 and the bore 311 and a radial thickness between the bore 311 and a drainage chamber that is in fluid communication with the outlet 319 where an opening 317 in the bore wall 318 allows for passage of lubricant and where lubricant may also pass, for example, at a compressor end and/or at a turbine end of the bore wall 318.

As shown in the example of FIG. 3, the ports 316-1 and 316-2 are formed in the bore wall 318 and may be defined at least in part by an azimuthal span (e.g., in degrees) and an axial dimension. For example, a port may span an arc of about a few degrees to about 10 degrees or more. As an example, an axial dimension may be determined at least in part with respect to a lubricant opening of a bearing assembly. Dimensions of various features may be determined, for example, based at least in part on lubricant pressure and/or one or more other lubricant properties (e.g., viscosity, etc.). As an example, dimensions of various features may be determined based at least in part on one or more analyses of operational conditions (e.g., amount of damping desired, balance between spring and viscous effects, etc.).

Figure 4:
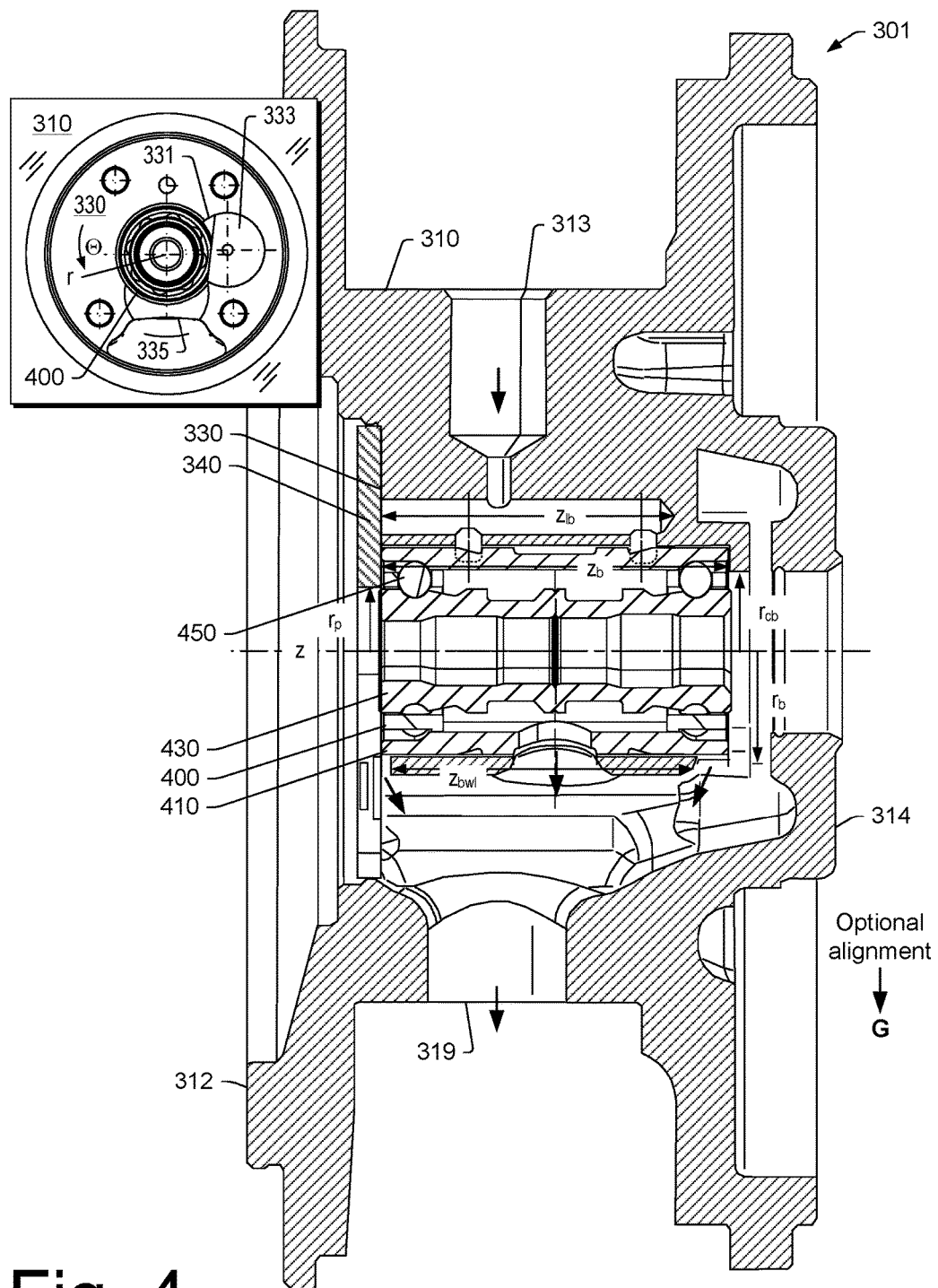
FIG. 4 is a cross-sectional view of the system of FIG. 3.

FIG. 4 is a cross-sectional view of an example of an assembly 301 that includes the assembly 300 of FIG. 3 and a bearing assembly or rolling element bearing unit 400. FIG. 4 also includes a compressor side view of the assembly 301 without the plate 340 where the housing 310 is shown as including the rolling element bearing unit 400 along with an anti-rotation mechanism (e.g., a mechanism that may allow for some limited amount of rotation of the rolling element bearing unit 400 in the bore 311 of the housing 310).

As shown in FIG. 4, the plate 340 is mounted to the housing 310, for example, via one or more components and/or features such as bolts, threads, bayonet, etc.

As shown in the example of FIG. 4, the rolling element bearing unit 400 includes an outer race 410, an inner race 430 and rolling elements 450 where the outer race 410 can be axially located between the plate 340 and a counter-bore of the housing 310. For example, the plate 340 may act to limit axial movement at the compressor side 312 of the housing 310 and the counter-bore may be a part of the housing 310 that acts to limit axial movement toward the turbine side 314 of the housing 310. As an example, a clearance may exist where an axial dimension between the plate 340 and a face of the counter-bore exceeds an axial dimension of the outer race 410 of the rolling element bearing unit 400.

As shown in the example of FIG. 4, the anti-rotation mechanism can include a recess 331 and a component 333 that can move in the recess 331. The component 333 can be shaped substantially as a coin with a flat that may be defined, for example, as a chord (e.g., a chord length) of a circle; noting that a coin may have another shape or shapes. As an example, the outer race 410 can include a flat (e.g., a chord or chord length) that can be in a position parallel to the flat of the component 333. In such an example, upon rotation of the outer race 410, the flats can contact (e.g., optionally with a lubricant film disposed therebetween). Upon contact, the component 333 can move. For example, the component 333 can rotate in the recess such that the flats contact each other in a manner that limits rotation of the outer race 410. In the example of FIG. 4, the component 333 may rotate in the recess 331 in a clockwise direction or in a counter-clockwise direction. Lubricant flowing along a wall of the bore 311 of the housing 310 may lubricate the component 333 and/or the recess 331. As an example, lubricant may drain via a cutout portion or recessed portion 335 of the recessed surface 330 of the housing 310.

In the example of FIG. 4, a cylindrical coordinate system is shown as including r, z and Θ coordinates and various dimensions are also shown, including a bore radius $r_b$, a counter-bore radius $r_{cb}$, a plate opening radius $r_p$, a bore length $z_b$, a lubricant passage length $z_{lb}$ and a lower bore wall length $z_{bwl}$, which may be dimensioned at a compressor end to form at least an axial clearance with respect to the plate 340. A direction of gravity is also shown, G, where the housing 310 may be optionally substantially aligned therewith, for example, to facilitate drainage of lubricant where desirable.

FIGS. 5A, 5B, 5C and 5D are a series of views of an example of a housing 510. As shown, the housing 510 includes a recessed surface 530 that includes a passage 550 that spans an angle $\phi_p$ between an end 552 and an end 554 about a portion of a through bore 511 of the housing 510. As shown in an enlarged inset view of FIG. 5A, the passage 550 may be defined in part by a radial width $\Delta r_p$ and, for example, one or more radii $r_p$. The bore 511 can include a compressor side end that may be formed as an opening in the recessed surface 530 (e.g., a compressor side facing surface) where a channel 535 can allow for drainage of lubricant from the bore 511.

Figure 5A:
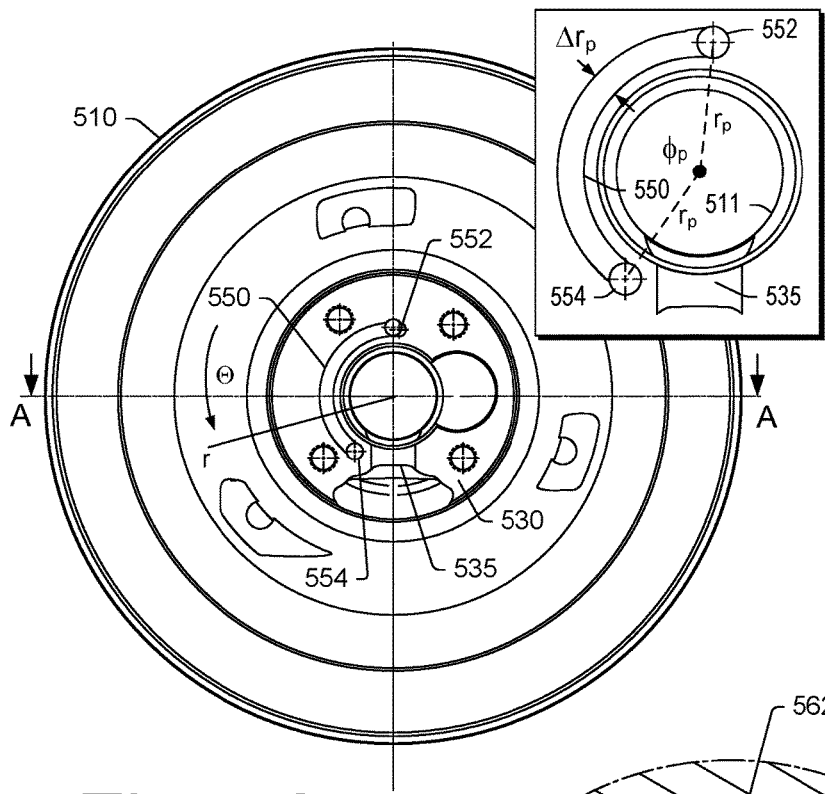
FIGS. 5A, 5B, 5C and 5D are a series of views of an example of an housing.
Figure 5B:
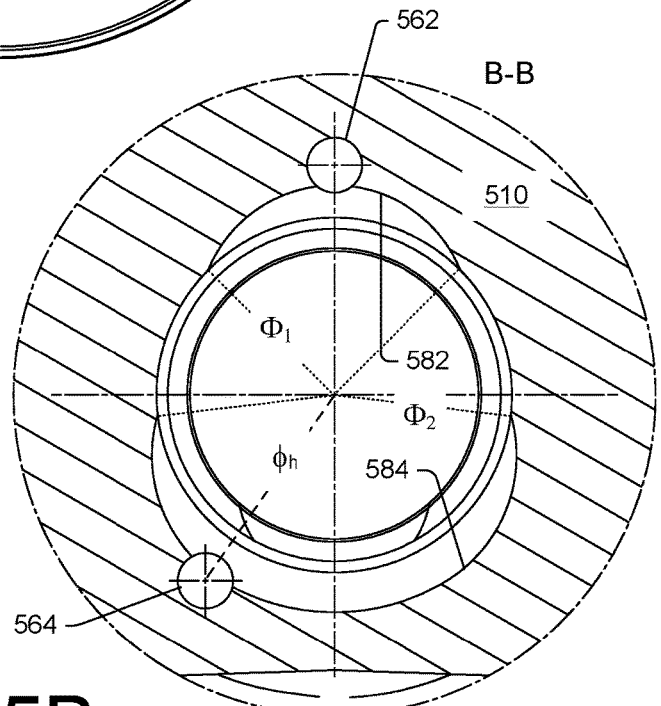

In FIG. 5B, a cross-sectional view along a line B-B is shown (see, e.g., FIG. 5C) where radial recesses 582 and 584 extend radially outwardly from the bore 511, which is defined by a wall of the housing 510. As shown in the example of FIG. 5B, the radial recess 582 is in fluid communication with an axial bore 562 and the radial recess 584 is in fluid communication with an axial bore 564. The radial recess 582 can span an angle $\Phi_1$ and the radial recess 584 can span an angle $\Phi_2$. The axial bore 562 can be at an angle $\phi_h$ with respect to the axial bore 564 where, for example, the span of the passage 550 can be approximately equal to or greater than the angular span between the axial bores 562 and 564 (e.g., the angle $\phi_p$ can be approximately equal to or greater than the angle $\phi_h$).

As an example, a radial recess may be referred to as a crescent or half-moon or other type of feature. As an example, a radial recess may be defined by a span, a radial depth (e.g., a maximum radial depth) and an axial thickness (e.g., or axial thicknesses). As an example, a radial recess can communicate lubricant fluidly with a through bore of a housing, for example, to lubricate a bearing, bearings, etc. As an example, a radial recess can be in fluid communication with an axial bore that is an axial lubricant bore in which lubricant may flow from a source to the radial recess. As an example, a housing can include radial recesses that differ with respect to one or more spatial parameters (e.g., span, maximum radial depth, axial thickness, etc.). As an example, a radial recess may be a gravity support radial recess where it spans at least a portion of a bore of a housing that can be oriented downwardly with respect to gravity. In such an example, flow of lubricant to the radial recess may help to support, fluidically, a bearing, a bearing assembly, a bearing unit, etc. For example, where acceleration of gravity acts upon a component (e.g., or assembly, unit, etc.), flow of fluid to a gravity support radial recess may counteract the effect such that the component lifts off of a bore wall in a through bore of a housing. As an example, fluid may assist with control of settling of a component (e.g., or assembly, unit, etc.), for example, when an engine is shut-off (e.g., when exhaust flow to an exhaust turbine of a turbocharger is terminated).

Figure 5C:
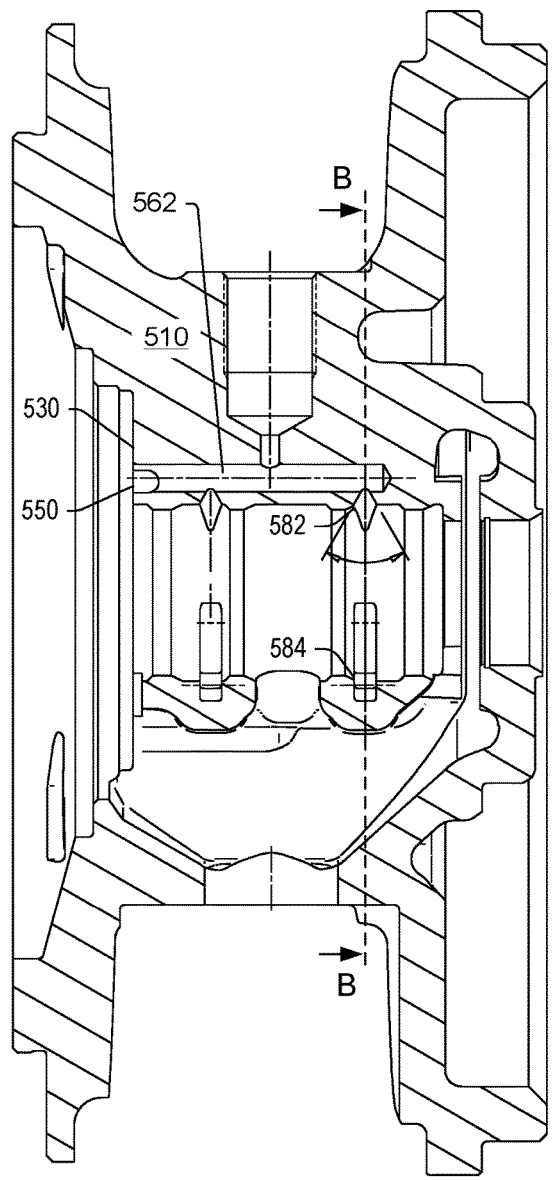
Figure 5D:
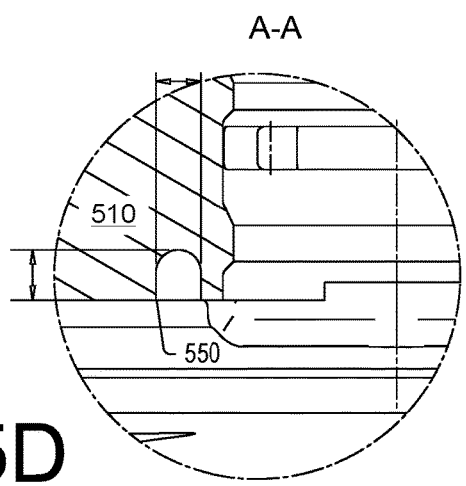

FIG. 5C shows a cross-sectional view of the housing 510 where a portion of the radial recess 582 and a portion of the radial recess 584 are shown (see also FIG. 5B). FIG. 5D shows a cross-sectional view of a portion of the housing 510 along a line A-A (see, e.g., FIG. 5A) where a depth of the passage 550 is illustrated.

As an example, lubricant may flow axially outwardly in the axial bore 562 toward the recessed surface 530 and to the passage 550 where it may then flow in an azimuthal direction to the axial bore 564. The lubricant may then flow axially inwardly in the axial bore 564 away from the recessed surface 530 and to the radial recess 584. Lubricant may also flow axially inwardly in the axial bore 562 away from the recessed surface 530 and to the radial recess 582. As an example, an axial bore may be in fluid communication with one or more radial recesses. For example, as shown in FIG. 5D, a housing can include one or more compressor-side radial recesses and one or more turbine-side radial recesses.

Figure 6:
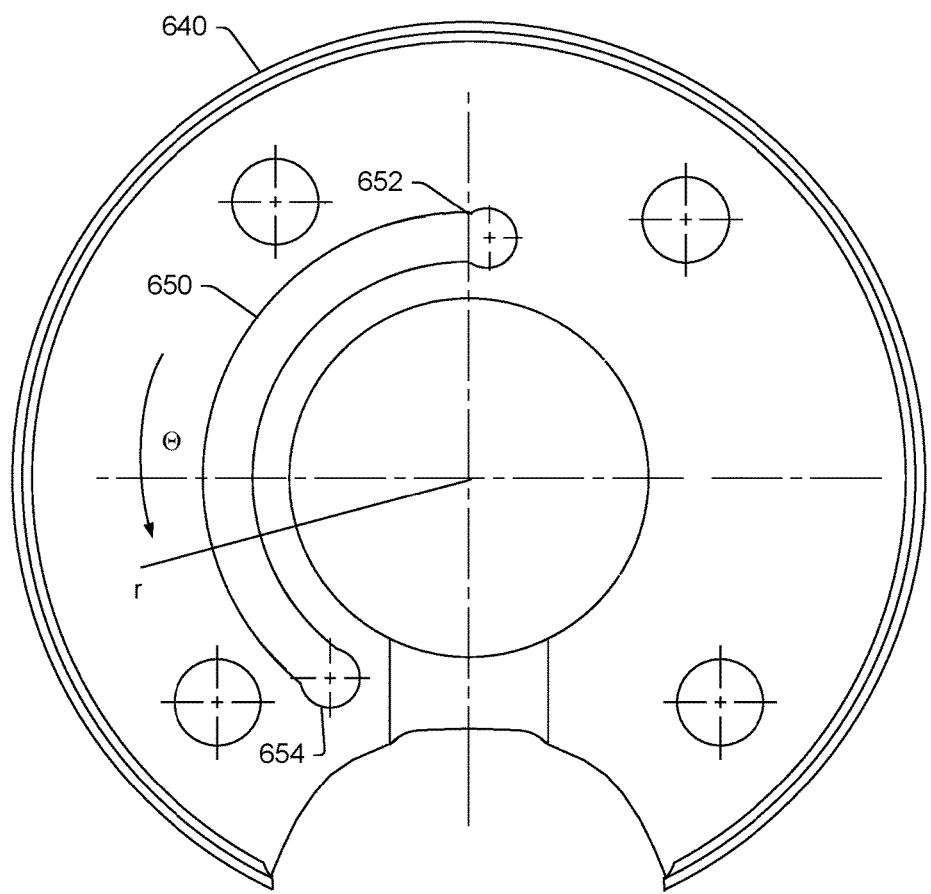
FIG. 6 is a view of an example of a plate.

FIG. 6 is a view of an example of a plate 640. As an example, an assembly can include a passage in a housing and/or a passage in a plate where such a passage or passages can communicate fluid at least in part in an azimuthal direction about a through bore. For example, such fluid may be communicated from one axial bore to another axial bore via a passage or passages in a housing and/or in a plate.

As shown in the example of FIG. 6, the plate 640 includes a passage 650 that spans from an end 652 to an end 654. Various parameters described with respect to the passage 550 of the housing 510 may be utilized to define a passage in a plate. As an example, where a housing includes a passage and a plate includes a passage, fluid may flow in such passages at least in part in an azimuthal direction (e.g., or directions). As an example, passages can overlap. As an example, a passage in a plate can include a cross-sectional shape and/or a passage in a housing can include a cross-sectional shape. As an example, a cross-sectional shape may be a semi-circular shape, a polygonal shape, a semi-elliptical shape, etc.

As an example, a plate can include a substantially flat surface that acts to cover a passage that is recessed into a surface of a housing. For example, the passage 550 of the housing 510 may be covered by a plate such as the plate 640 where the plate 640 is without the passage 650. As an example, the passage 650 may be substantially equivalent to the passage 550 of the housing 510 but for being a mirror image thereof. In such an example, two cross-sectional shapes may be joined to form a passage that is defined in part by the housing 510 and defined in part by the plate 640. As an example, the housing 510 can be without the passage 550 such that the plate 640 may be joined to the housing 510 to allow for communication of fluid at least in part in an azimuthal direction about the through bore 511 of the housing 510. As may be appreciated, an azimuthal span may be formed via a plate, formed via a housing, formed in part via a housing and formed in part via a plate, etc.

As an example, a portion of a passage may be formed in part via an anti-rotation mechanism. For example, a "coin" with a flat edge may be shaped to form at least a portion of a passage through which fluid may flow. As an example, either face or both faces of such a coin may include features for fluid flow (e.g., to define at least a portion of a passage). As an example, such a coin may include an aperture where fluid flows to the aperture on one side of the coin and flows away from the aperture on another side of the coin. In such an example, one or both sides of the coin may include features that form, at least in part, a passage or passages.

FIGS. 7A, 7B, 7C and 7D are a series of views of an example of a housing 710. As shown, the housing 710 includes a recessed surface 730 that includes a passage 750 that spans an angle $\phi_p$ between an end 754 and an end 756 about a portion of a through bore 711 of the housing 710. As shown in an enlarged inset view of FIG. 7A, the passage 750 may be defined in part by a radial width $Ar_p$ and, for example, one or more radii $r_p$. The bore 711 can include a compressor side end that may be formed as an opening in the recessed surface 730 (e.g., a compressor side facing surface) where a channel 735 can allow for drainage of lubricant from the bore 711.

Figure 7A:
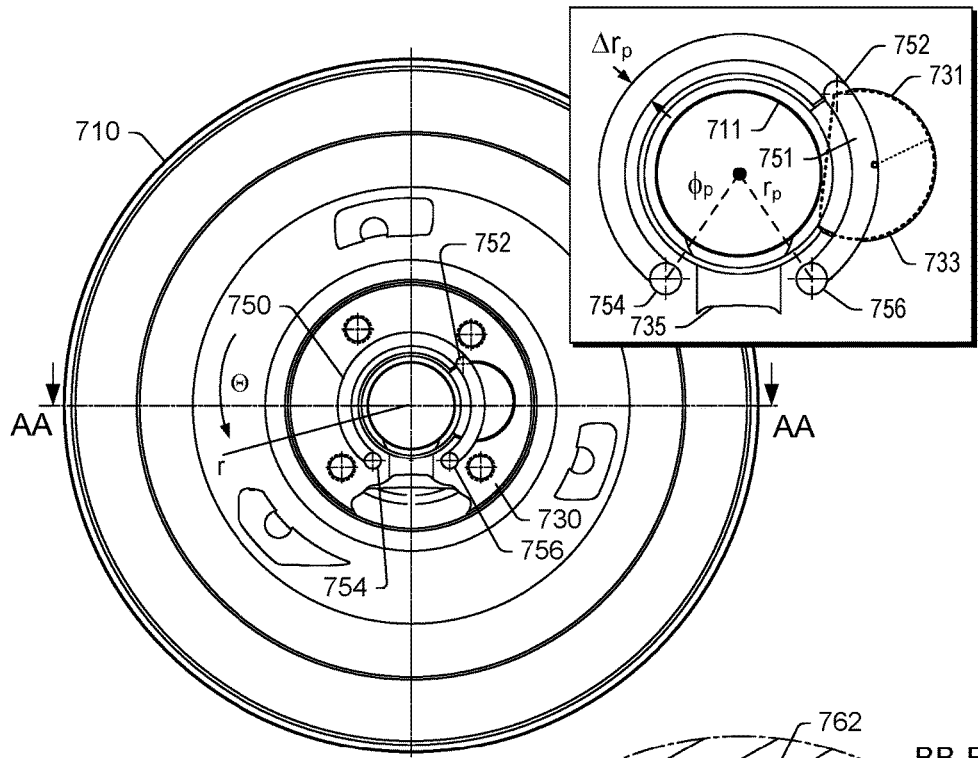
FIGS. 7A, 7B, 7C and 7D are a series of views of an example of an housing.

As shown in the enlarged inset view of FIG. 7A, the recessed surface 730 can further include an anti-rotation mechanism recess 731 and a coin 733 (e.g., as outlined via dotted lines) that can be seated at least in part in the recess 731. In such an example, a portion 751 of the passage 750 may be axially displaced away from the recessed surface 730. In such an example, the coin 733 may cover at least a portion of the portion 751 of the passage 750. In such an example, lubricant that flows in the portion 751 of the passage 750 may help to lubricate the coin 733 in the recess 731. Such an approach may help to reduce heating, contact abrasion, etc. Such an approach may act to maintain the housing 710 and the coin 733 at approximately the same temperature, which may provide for a known profile as to thermal expansion/contraction of the portion of the housing 710 that forms the recess 731 and the coin 733. As an example, a lubricant film may be formed between at least a face of the coin 733 and at least a portion of a wall forming the recess 731.

Figure 7B:
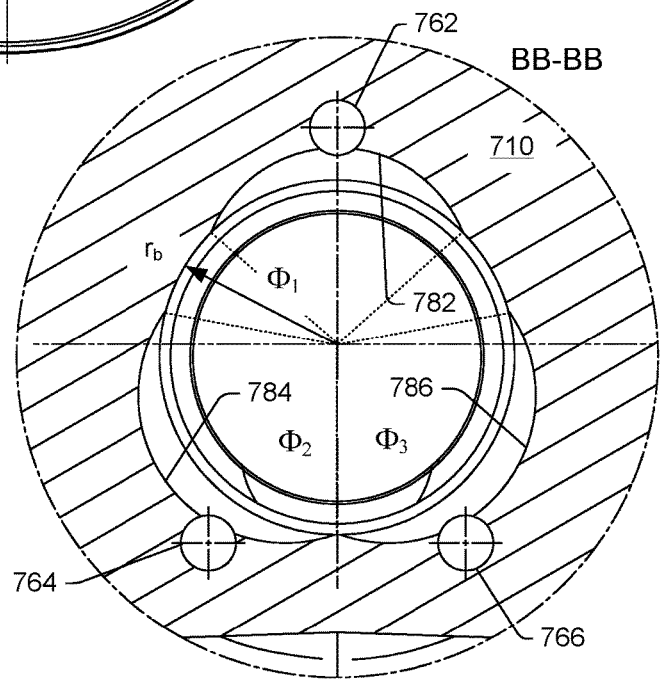

In FIG. 7B, a cross-sectional view along a line BB-BB is shown (see, e.g., FIG. 7C) where radial recesses 782, 784 and 786 extend radially outwardly from the bore 711, which is defined by a wall of the housing 710. As shown in the example of FIG. 7B, the radial recess 782 is in fluid communication with an axial bore 762, the radial recess 784 is in fluid communication with an axial bore 764 and the radial recess 789 is in fluid communication with an axial bore 766. The radial recess 782 can span an angle $\Phi_1$, the radial recess 784 can span an angle $\Phi_2$ and the radial recess 786 can span an angle $\Phi_3$. As an example, the spans can sum to a total of less than about 360 degrees. For example, one or more portions of the wall of the bore 711 may be retained at a bore radius $r_b$. The axial bore 762 can be at an angle with respect to the axial bore 764 and the axial bore 762 can be at an angle with respect to the axial bore 766.

As an example, a radial recess or radial recesses may be a gravity support radial recess or gravity support radial recesses where the radial recess can be filled with fluid to support a component (e.g., or assembly, unit, etc.) in a direction that can include a force direction that is away from the direction of the acceleration of Earth's gravity. For example, in FIG. 7B, the radial recesses 784 and 786 may be filled with fluid and act to lift a component away from the wall that defines the bore 711 of the housing 710.

As an example, a method can include actuating a lubricant pump, flowing lubricant to at least one radial recess and applying force to a component (e.g., or assembly, unit, etc.) disposed in a bore of a housing where the force includes a direction (e.g., a vector component direction) that is away from the direction of the acceleration of Earth's gravity. As an example, such a method may commence prior to combustion taking place within an internal combustion engine. For example, electrical power (e.g., battery power) may cause an electric motor to pump lubricant and/or cause an engine crank shaft to rotate in a manner that causes pumping of lubricant. In such an example, force may be generated within a housing of a turbocharger assembly prior to flow of combustion exhaust to an exhaust turbine of the turbocharger assembly such that a bearing, a bearing assembly, a bearing unit, etc. is lifted and/or facilitated in being lifted away from a resting or settling portion of a wall of the housing that defines a through bore of the housing (e.g., consider a portion of the wall that may make contact with an outer race of a rolling element bearing unit).

As an example, fluid may assist with control of settling of a component (e.g., or assembly, unit, etc.), for example, when an engine is shut-off (e.g., when exhaust flow to an exhaust turbine of a turbocharger is terminated).

Figure 7C:
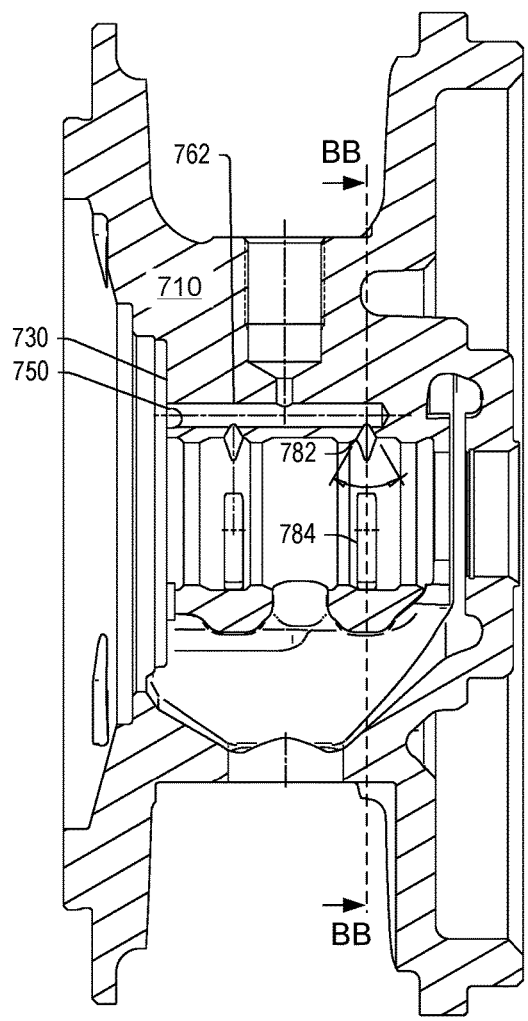
Figure 7D:
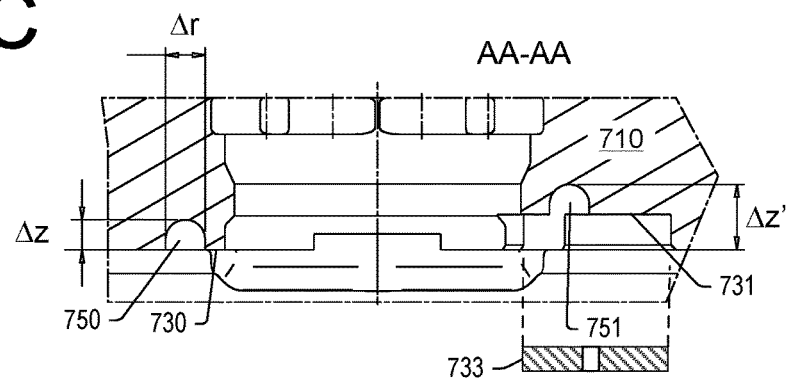

FIG. 7C shows a cross-sectional view of the housing 710 where a portion of the radial recess 782 and a portion of the radial recess 784 are shown (see also FIG. 7B). FIG. 7D shows a cross-sectional view of a portion of the housing 710 along a line AA-AA (see, e.g., FIG. 7A) where a depth of the passage 750 is illustrated and a depth of the portion 751 of the passage 750 is illustrated.

In the example of FIG. 7D, the recessed surface 730 is shown along with the recess 731. As an example, the coin 733 may be seated at least in part in the recess 731 to cover at least a portion of the portion 751 of the passage 750. As mentioned, the coin 733 can include a flat (e.g., defined by a chord of a circle, etc.) and an outer race of a rolling element bearing assembly or unit can include a flat (e.g., define by a chord of a circle, etc.). In such an example, the two flats may be spaced a distance apart when parallel to each other such that upon an amount of rotation of the outer race the flats contact to limit rotation of the outer race in the through bore of a housing. In such an example, the coin can rotate about its axis as seated at least in part in a recess of the housing. In the example of FIG. 7D, the portion 751 of the passage 750 can include lubricant (e.g., oil, etc.) where a film may develop between a face of the coin 733 and a surface of the recess 731, which may help to lubricate the coin 733 as it may rotate in a clockwise direction or a counter-clockwise direction responsive to rotation of an outer race. As an example, lubricant may lubricate a flat (e.g., a contact surface) of the coin 733, which may help to reduce wear of the coin 733 and/or an outer race.

As an example, lubricant may flow axially outwardly in the axial bore 762 toward the recessed surface 730 and to the passage 750 where it may then flow in an azimuthal direction to the axial bore 764 (e.g., counter-clockwise in the view of FIG. 7A). The lubricant may then flow axially inwardly in the axial bore 764 away from the recessed surface 730 and to the radial recess 784. Lubricant may also flow axially inwardly in the axial bore 762 away from the recessed surface 730 and to the radial recess 782.

As an example, lubricant may flow axially outwardly in the axial bore 762 toward the recessed surface 730 and to the passage 750 where it may then flow in an azimuthal direction to the axial bore 766 (e.g., clockwise in the view of FIG. 7A). The lubricant may then flow axially inwardly in the axial bore 766 away from the recessed surface 730 and to the radial recess 786.

As an example, an axial bore may be in fluid communication with one or more radial recesses. For example, as shown in FIG. 7D, a housing can include one or more compressor-side radial recesses and one or more turbine-side radial recesses.

Figure 8:
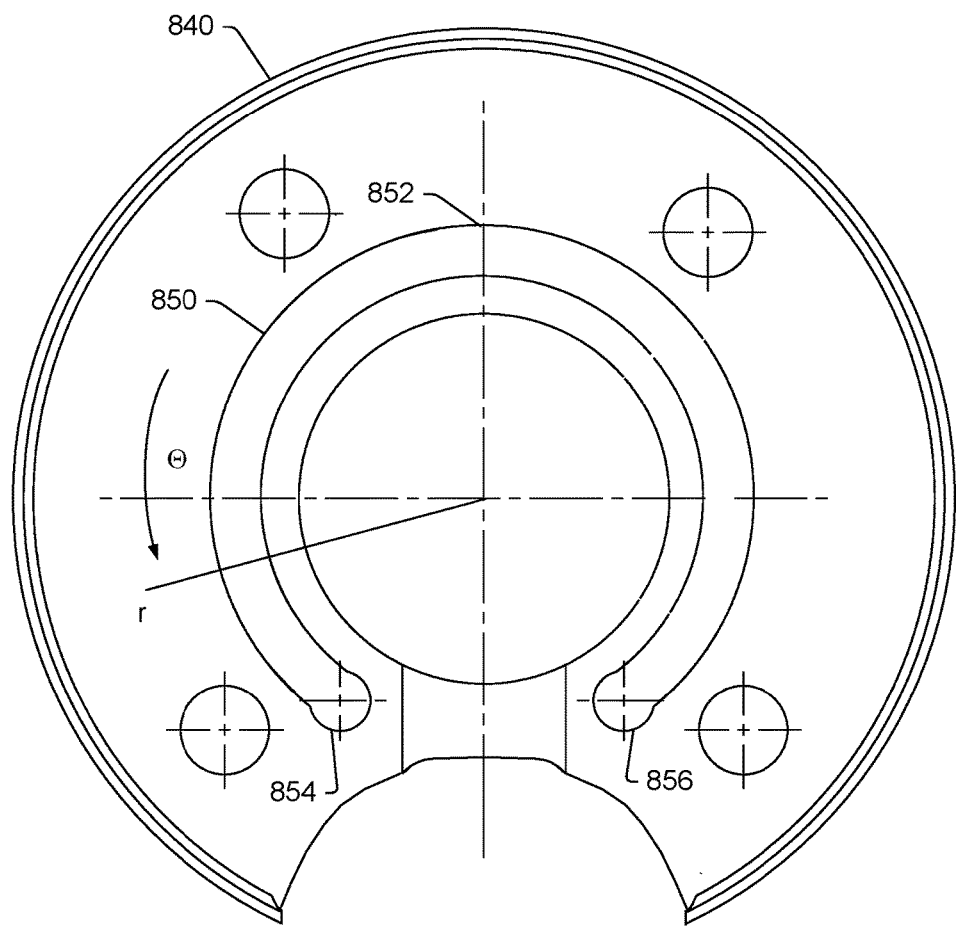
FIG. 8 is a view of an example of a plate.

FIG. 8 is a view of an example of a plate 840. As an example, an assembly can include a passage in a housing and/or a passage in a plate where such a passage or passages can communicate fluid at least in part in an azimuthal direction about a through bore. For example, such fluid may be communicated from one axial bore to another axial bore via a passage or passages in a housing and/or in a plate.

As shown in the example of FIG. 8, the plate 840 includes a passage 850 that spans from an end 852 to an end 854. Various parameters described with respect to the passage 750 of the housing 710 may be utilized to define a passage in a plate. As an example, where a housing includes a passage and a plate includes a passage, fluid may flow in such passages at least in part in an azimuthal direction (e.g., or directions). As an example, passages can overlap. As an example, a passage in a plate can include a cross-sectional shape and/or a passage in a housing can include a cross-sectional shape. As an example, a cross-sectional shape may be a semi-circular shape, a polygonal shape, a semi-elliptical shape, etc. As an example, a coin such as the anti-rotation coin 733 may include one or more features (e.g., surfaces, recesses, apertures, etc.) that can define part of a passage or passages (e.g., optionally with one or more of a plate and a housing).

As an example, a plate can include a substantially flat surface that acts to cover a passage that is recessed into a surface of a housing. For example, the passage 750 of the housing 710 may be covered at least in part by a plate such as the plate 840 where the plate 840 is without the passage 850. As an example, at least a portion of the passage 850 may be substantially equivalent to the passage 750 of the housing 710 but for being a mirror image thereof. In such an example, two cross-sectional shapes may be joined to form a passage that is defined in part by the housing 710 and defined in part by the plate 840. As an example, the housing 710 can be without the passage 750 such that the plate 840 may be joined to the housing 710 to allow for communication of fluid at least in part in an azimuthal direction or azimuthal directions about the through bore 711 of the housing 710. As may be appreciated, an azimuthal span may be formed via a plate, formed via a housing, formed in part via a housing and formed in part via a plate, formed in part via a coin, etc.

As an example, a portion of a passage may be formed in part via an anti-rotation mechanism. For example, a "coin" with a flat edge may be shaped to form at least a portion of a passage through which fluid may flow. As an example, either face or both faces of such a coin may include features for fluid flow (e.g., to define at least a portion of a passage). As an example, such a coin may include an aperture where fluid flows to the aperture on one side of the coin and flows away from the aperture on another side of the coin. In such an example, one or both sides of the coin may include features that form, at least in part, a passage or passages.

Figure 9:
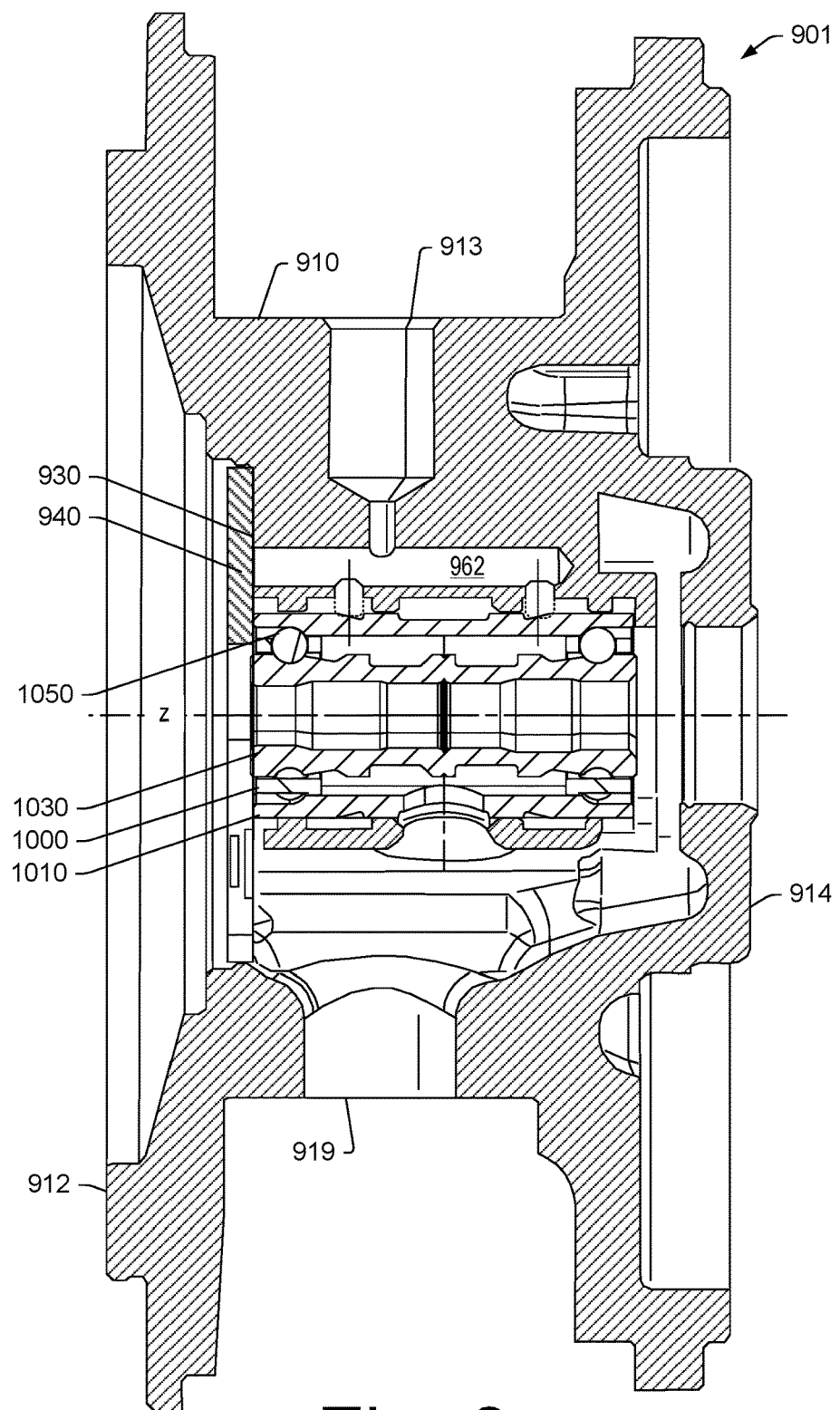
FIG. 9 is a cross-sectional view of an example of a system.

FIG. 9 is a cross-sectional view of an example of a system 901 that includes a housing 910 and a bearing assembly 1000 disposed in a through bore of the housing 910. As shown in FIG. 9, the bearing assembly 1000 includes an outer race 1010, an inner race 1030 and rolling elements 1050 disposed between the outer race 1010 and the inner race 1030. As an example, a bearing assembly can include sets of rolling elements such as, for example, a compressor-side set and a turbine-side set. As an example, an inner race may be a multi-piece inner race. As an example, an outer race may be a multi-piece outer race.

As shown in FIG. 9, the housing 910 includes a compressor side end 912 and a turbine side end 914 as well as a lubricant inlet 913 and a lubricant exit 919. The housing 910 includes a recessed surface 930 (e.g., a recessed face) that is axially offset from the compressor side end 912 and disposed between the compressor side end 912 and the turbine side end 914. In the example of FIG. 9, the system 901 includes a plate 940 that is seated against the recessed surface 930 and that includes an inner radius that is less than an outer radius of the outer race 1010 such that the plate 940 can form an axial stop surface that can act to axially locate the bearing assembly 1000 in the bore of the housing 910, which can be a stepped bore where a counter-bore forms another axial stop surface. As an example, the outer race 1010 can include an axial length that is less than an axial distance between a surface of the plate 940 and a surface of the counter-bore of the housing 910. In the example of FIG. 9, the housing 910 includes an axial bore 962 that is in fluid communication with the lubricant inlet 913 such that lubricant can be delivered from the lubricant inlet 913 to the axial bore 962 and further to the through bore, for example, via one or more routes.

FIGS. 10A and 10B are a series of views of a portion of the system 901 of FIG. 9. As shown, the bearing assembly 1000 can be disposed in the through bore of the housing 910 to define various fluid regions where lubricant can flow, for example, to form lubricant films, which may include, for example, one or more squeeze film dampers (SFDs).

As shown, the bearing assembly 1000 includes the outer race 1010 with outer surface portions that form annular channels 1082 and 1084 and with outer surface portions 1091, 1093, 1095 and 1097 that are disposed at substantially the same outer diameter. As shown, annular channel 1082 is disposed between the surface portions 1091 and 1093 and the annular channel 1084 is disposed between the surface portions 1095 and 1097. Each of the annular channels 1082 and 1084 can include one or more jet openings that can direct lubricant to rolling elements 1050, which may be balls or another type of rolling element.

As shown, the housing 910 includes bore wall portions 991, 992, 993, 994, 996, 997, 998 and 999, which can form fluid chambers 971, 972, 973, 974, 975, 976, 977, 978 and 979 with respect to the outer surface of the outer race 1010. As an example, the bore wall portions 992, 994, 996 and 998 may be disposed at a first radius $r_1$ and the bore wall portions 991, 993, 995, 997 and 999 may be disposed at a second radius $r_2$ where $r_2$ is greater than $r_1$. As shown, the housing 910 includes openings 982 and 984 where the opening 982 is in fluid communication with the fluid chamber 973 and where the opening 984 is in fluid communication with the fluid chamber 977. In such an example, a lubricant bore can provide lubricant to the openings 982 and 984 where such lubricant may flow into the fluid chambers 973 and 977, respectively, and into the annular channels 1082 and 1084, respectively, for example, to flow via jet openings to respective sets of rolling elements of the bearing assembly 1000. Where the inner race 1030 is fit to a shaft, lubrication of the rolling elements 1050 can facilitate rotation of the shaft; noting that the outer race 1010 can be axially located within the housing 910 and optionally limited in its rotation via one or more anti-rotation mechanisms (see, e.g., the recess 331 and the component 333 of FIG. 4, etc.).

As shown in FIG. 10A, the outer race 1010 can include the surface portions 1091, 1093, 1095 and 1097 disposed at an outer radius $r_o$, which is less than $r_1$. When a shaft of a turbocharger is at rest, the outer race 1010 may be positioned eccentrically in the through bore of the housing 910. Where lubricant flows to the through bore, the lubricant may act to lift the outer race 1010, more particularly, the lubricant may act to lift a rotating assembly that includes the bearing assembly, a compressor wheel, a shaft and a turbine wheel. Upon lifting, the outer race 1010 may be less eccentrically disposed (e.g., more evenly centered) within the through bore of the housing 910 and thus clearances between, for example, the outer race surface portions at $r_o$ and the bore wall portions at $r_1$ and the outer race surface portions at $r_o$ and the bore wall portions at $r_2$, may be more even annularly.

FIG. 10B corresponds to a state where the outer race 1010 is substantially evenly centered in the through bore of the housing 910. For example, a longitudinal axis of the outer race 1010 and a longitudinal axis of the through bore of the housing 910 can be substantially coaxial (e.g., coaxially aligned).

In FIG. 10B, arrows represent approximate directions in which lubricant may flow. As an example, the fluid chambers 973 and 977 may be considered to be high pressure fluid chambers when compared to the fluid chambers 971, 975 and 979, which may be considered to be low pressure fluid chambers. As an example, the fluid chambers 973 and 977 may be referred to as feed chambers (e.g., lubricant feed chambers) and the fluid chambers 971, 975 and 979 may be referred to as drainage chambers (e.g., lubricant drainage chambers).

As shown in FIG. 10B, clearances are diminished between the high pressure fluid chambers 973 and 977 and the corresponding low pressure fluid chambers 971, 975 and 979. As shown, lubricant can flow axially from the fluid chamber 973 to the fluid chamber 971 via a film clearance; lubricant can flow axially from the fluid chamber 973 to the fluid chamber 975 via a film clearance; lubricant can flow axially from the fluid chamber 977 to the fluid chamber 975 via a film clearance; and lubricant can flow axially from the fluid chamber 977 to the fluid chamber 979 via a film clearance.

As an example, in FIG. 10B, the fluid chambers 973 and 977 can be annular fluid chambers that form a 360 degree fluidic annulus about the outer race 1010. As an example, in FIG. 10B, the film clearances can be annular lubricant film clearances that form a 360 degree fluidic film annulus about the outer race 1010.

In FIGS. 10A and 10B, the housing 910 may include one or more openings in addition to the openings 982 and 984, which may be in fluid communication with a lubricant feed or lubricant feeds such that the fluid chambers 973 and 977 are fed via multiple openings disposed at different azimuthal angles about a longitudinal axis of the through bore of the housing 910.

Figure 11A:
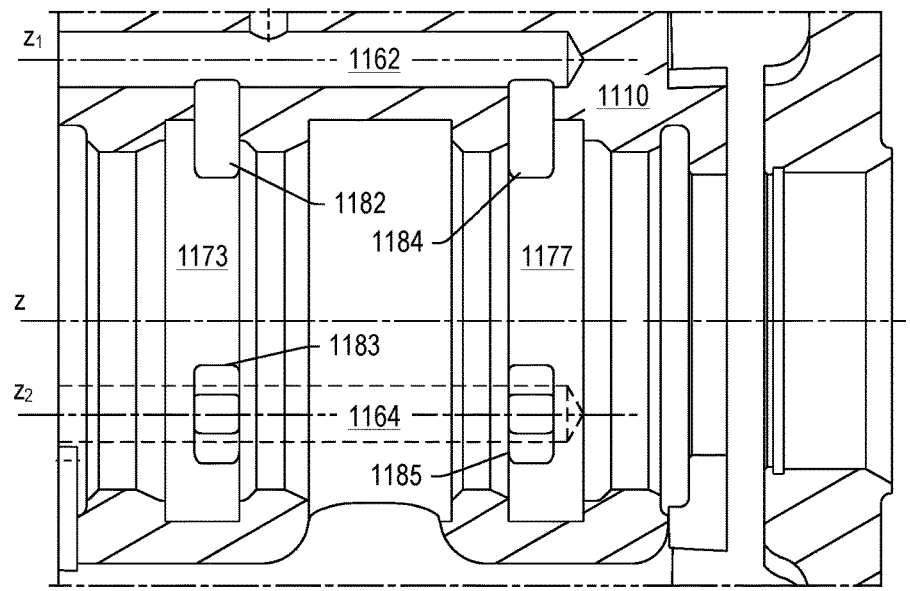
Figure 11B:
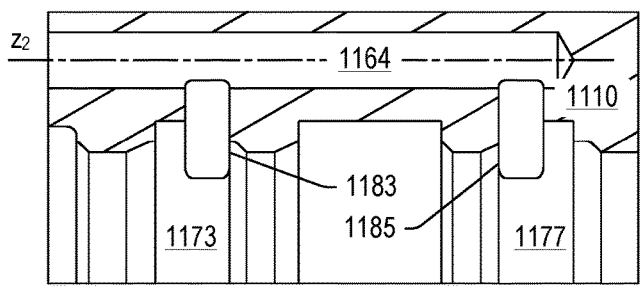
Figure 11C:
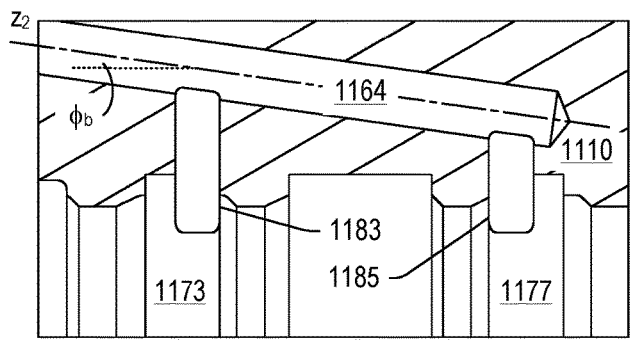

FIGS. 11A, 11B and 11O are a series of cross-sectional views of an example of a housing 1110 that includes a plurality of lubricant bores 1162 and 1164 with corresponding openings 1182 and 1184 and 1183 and 1185, respectively. As shown, the openings 1182 and 1183 are in fluid communication with a fluid chamber 1173 and the openings 1184 and 1185 are in fluid communication with a fluid chamber 1177. As shown in FIG. 11C, one or more lubricant bores may be disposed at an angle to a longitudinal axis of a through bore of the housing 1110. For example, FIG. 11C shows the lubricant bore 1164 being disposed at an angle $\phi_b$. In such an example, the opening 1183 is larger radially than the opening 1185. As an example, an angle may allow for a lubricant bore to be drilled directly to form an opening to a fluid chamber (e.g., consider the lubricant bore 1164 having an end at the fluid chamber 1177). As an example, a lubricant bore may be referred to as an axial bore or, for example, an axial lubricant bore. Such a bore can function as a passage for lubricant, for example, for flow of lubricant from a source or sources to a fluid chamber or fluid chambers.

Figure 12:
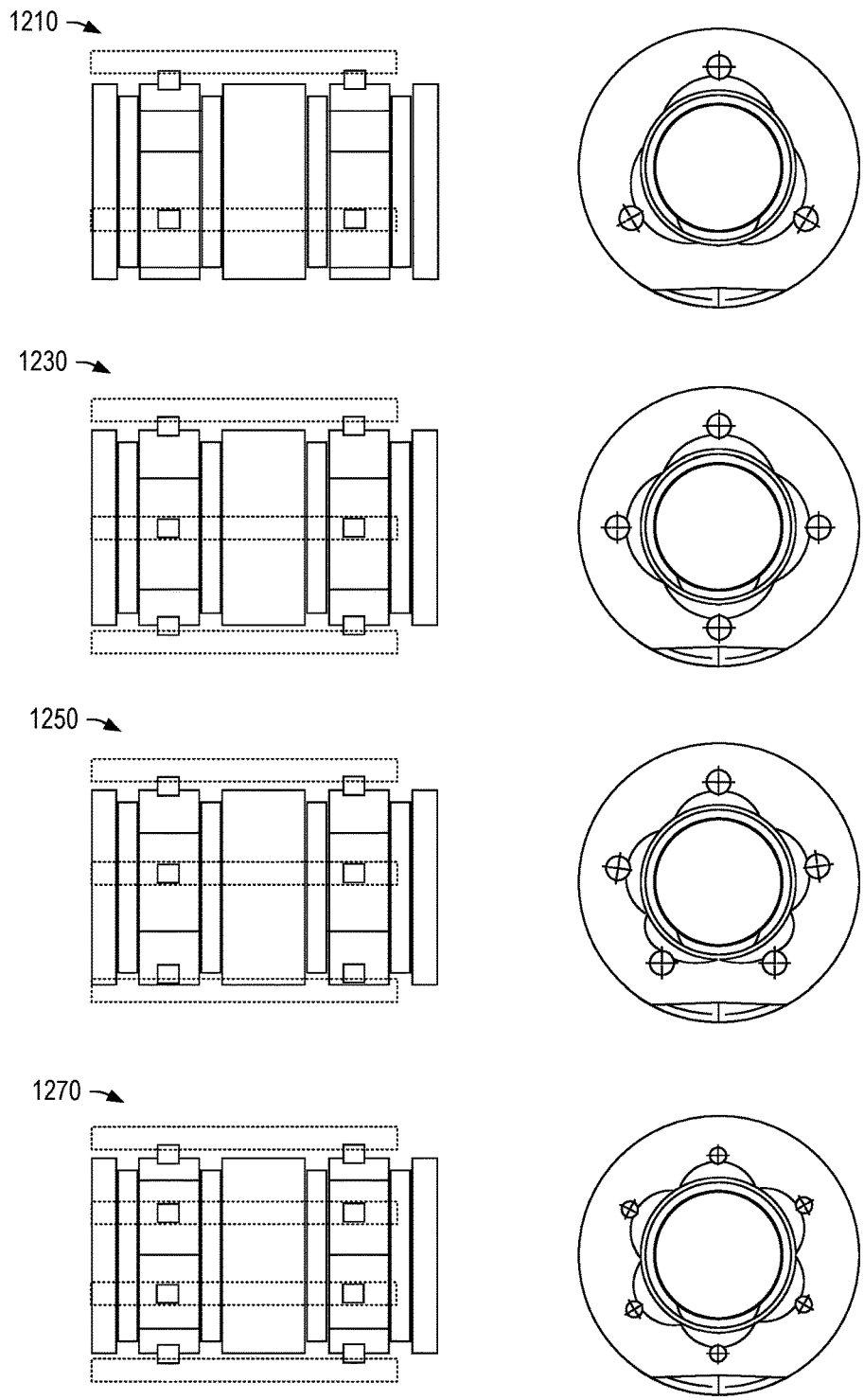
FIG. 12 is a series of views of examples of housings.
Figure 14A:
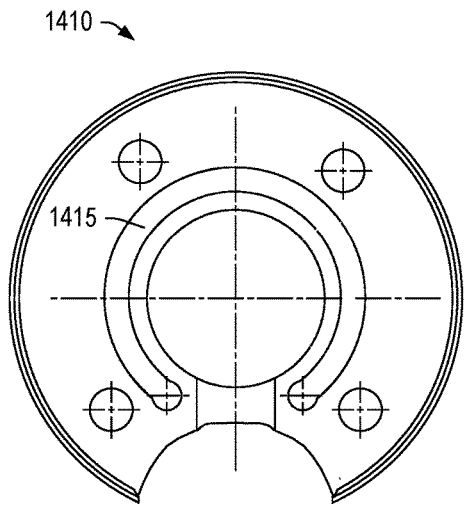
FIGS. 14A, 14B, 14C and 14D are a series of view of examples of features of a plate and a housing.
Figure 14B:
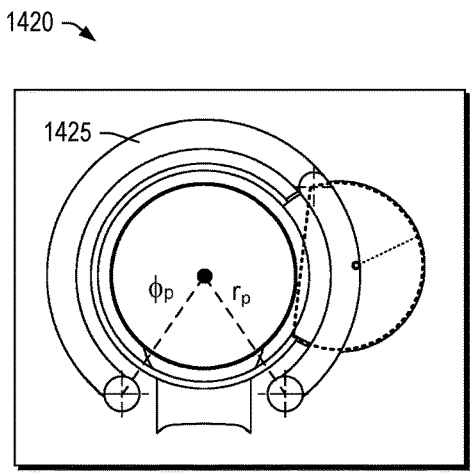
Figure 14C:
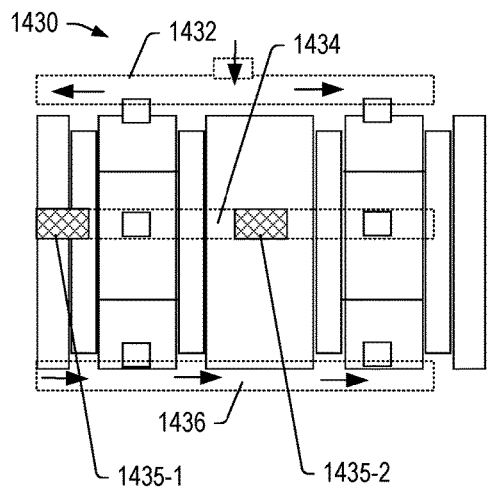
Figure 14D:
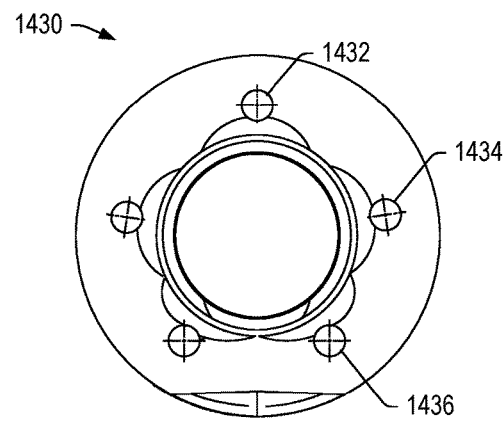

FIG. 12 is a series of views of examples of housings 1210, 1230, 1250 and 1270 where various lubricant bores are illustrated along with openings and radial recesses; noting that one or more of the housings 1210, 1230, 1250 and 1270 may include annular fluid chambers such as in the example housing 1110 of FIGS. 11A, 11B and/or 11O. As an example, one or more of the lubricant bores of FIG. 12 may be disposed at an angle.

FIGS. 13A, 13B and 13C are a series of views of an example of a housing 1310 that includes lubricant bores and openings. FIG. 13B is a cross-sectional view of the housing 1310 along a line E-E and FIG. 13C is a cross-sectional view of the housing 1310 along a line F-F. As shown in FIGS. 13A, 13B and 13C, a lubricant bore may extend at least in part axially to feed one or more regions.

FIGS. 14A, 14B, 14C and 14D are a series of view of examples of features of a plate 1410 and a housing 1420. As shown, the plate 1410 can include a passage 1415 and the housing 1420 can include a passage 1425. As an example, a housing 1430 can include a plurality of lubricant bores (see, e.g., lubricant bores labeled 1432, 1434 and 1436) where one or more of the lubricant bores may include a plug or plugs 1435-1 and 1435-2. As an example, a plug may be a seal plug or may be a flow regulator plug. For example, a flow regulator plug may include one or more openings, channels, etc. that control flow of lubricant. In such an example, a housing may be machined with a plurality of lubricant bores and plugs/flow regulators may optionally be disposed in one or more of the lubricant bores, for example, to achieve a desired flow of lubricant to a through bore of the housing 1430.

As shown, one or more lubricant bores may be fed via a passage or passages in a housing and/or one or more lubricant bores may be fed via a passage or passages in a plate (e.g., a thrust plate, a seal plate, etc.). As an example, a plate may be a thrust plate where a portion of the plate serves as an axial stop with an outer race of a bearing assembly. In such an example, thrust force may cause the outer race to move axially and contact the thrust plate. As an example, a plate may be a seal plate that may or may not include a portion that can contact an outer race of a bearing assembly. For example, a seal plate may act to seal a passage or passages without accepting thrust force directly from an outer race of a bearing assembly.

Figure 15A:
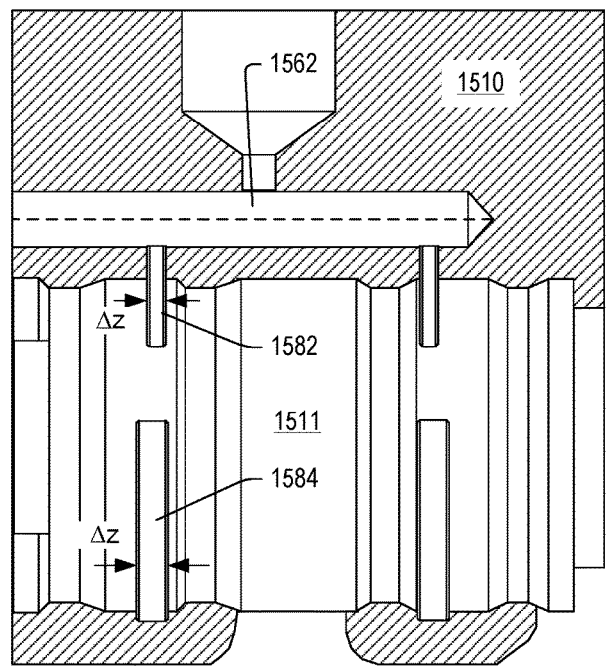
FIGS. 15A and 15B are a series of cross-sectional views of an example of a housing.
Figure 15B:
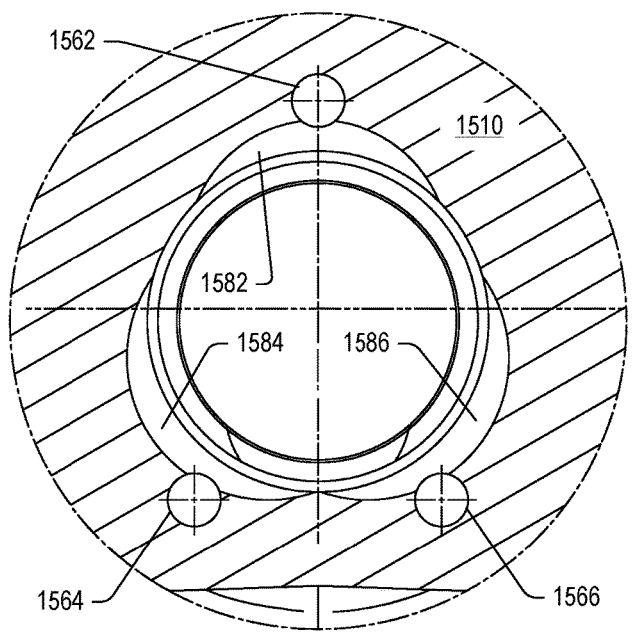

FIGS. 15A and 15B are a series of cross-sectional views of an example of a housing 1510. In the example of FIGS. 15A and 15B, various dimensions are illustrated where a radial recess may be defined in part via an axial dimension. For example, the housing 1510 includes radial recesses 1582, 1584 and 1586 as recessed from a bore wall that defines a through bore 1511 of the housing 1510 where a longitudinal axis of the through bore 1511 may serve as an axis for measuring a axial dimension of a radial recess. In the example of FIGS. 15A and 15B, the radial recess 1582 may be defined in part by an axial dimension that may optionally differ from an axial dimension that defines in part the radial recess 1584 and/or the radial recess 1586. As an example, an axial dimension of a radial recess may define in part a volume of a radial recess and an amount of lubricant that the radial recess may hold.

As shown in the example of FIGS. 15A and 15B, the radial recess 1582 can be in fluid communication with a lubricant bore 1562, the radial recess 1584 can be in fluid communication with a lubricant bore 1564 and the radial recess 1586 can be in fluid communication with a lubricant bore 1566. As an example, a radial recess may be machined such that an opening is formed directly to a lubricant bore, which may be an axial lubricant bore (e.g., optionally set at an angle with respect to a longitudinal axis of the through bore 1511).

FIG. 16A shows a cross-sectional view of an example of a turbocharger system 1600 that includes a shaft 1602, a compressor housing 1604, a compressor wheel 1605, a turbine housing 1606, a turbine wheel 1607, an optional anti-rotation mechanism 1609, a center housing 1610, a journal bearing 1630 and a plate 1640. As shown, the shaft 1602 is supported by the journal bearing 1630 in a through bore of the center housing 1610 where the optional anti-rotation mechanism 1609 (e.g., a pin, etc.) may be received in a cross-bore of the center housing 1610 to limit rotation of the journal bearing 1630 about a longitudinal axis within the through bore of the center housing 1610. The turbine wheel 1607 is shown as being attached to the shaft 1602 to form a shaft and wheel assembly (SWA) while the compressor wheel 1605 is fit to another portion of the shaft 1602 and, for example, secured via a nut, etc.; noting that a compressor wheel with a partial bore may be utilized.

In the example of FIG. 16A and FIG. 16D, the center housing 1610 is shown as including three axial lubricant bores 1662, 1664 and 1666 that can be in fluid communication via a passage 1650 in the plated 1640, for example, as shown in FIG. 16A and FIG. 16C. As mentioned, a passage may be in a center housing and/or in a plate, which may be a seal plate or a thrust plate (e.g., depending on whether it can receive thrust forces associated with a shaft).

In the example of FIG. 16A and FIG. 16D, the through bore of the center housing 1610 includes openings 1665 and 1667 that fluidly communicate with the lubricant bores 1662, 1664 and 1666; noting that another arrangement of fluid communication, plugs, etc. may be implemented (see, e.g., FIGS. 11A, 11B, 110, 12, 13A, 13B, 13C, 14C and 14D).

As an example, the journal bearing 1630 can include a relatively constant diameter as to its outer surface and a through bore of the center housing 1610 can include different regions with associated diameters where at least two of the diameters differ. As an example, a region can be an annulus that spans about 360 degrees or, for example, a region can be a radial recess that spans less than 360 degrees.

FIG. 16B shows a cross-sectional view of the journal bearing 1630, which includes a cylindrical wall that extends from a compressor end to a turbine end and that includes various features therebetween. For example, the journal bearing 1630 can include a compressor side inner journal surface 1632, compressor side lubricant jets 1633 that can provide lubricant to the inner journal surface 1632, a turbine side inner journal surface 1634 and turbine side lubricant jets 1635 that can provide lubricant to the inner journal surface 1634. The journal bearing 1630 can include one or more openings such as the openings 1637 and 1639. In such an example, one of the openings may be suitable for receipt of a pin as part of an anti-rotation mechanism. For example, the anti-rotation mechanism 1609 can be received in a cross-bore of the center housing 1610 and be at least in part received via an opening in the journal bearing 1630 to limit azimuthal rotation and, for example, to limit axial movement of the journal bearing 1630 in the through bore of the center housing 1610. In such an example, the anti-rotational mechanism 1609 may receive thrust forces as communicated via the journal bearing 1630.

As an example, a journal bearing can include a flat and an anti-rotation mechanism can include a coin with a flat seated at least in part in a recess such that the flats can contact to limit rotation of the journal bearing in a through bore of a housing.

As an example, a journal bearing may be a rotatable journal bearing where it can rotate, for example, responsive to rotation of the shaft 1602. In such an example, lubricant films formed in a clearance or clearances between an outer surface of the journal bearing and an inner surface of the through bore of the center housing 1610 may respond to such rotation. As an example, where the journal bearing 1630 is limited via the anti-rotation mechanism 1609, the journal bearing 1630 may float on a lubricant film, for example, in a direction along an axis of the anti-rotation mechanism 1609 (e.g., up and down in the view of FIG. 16A).

As an example, the lubricant bores 1662, 1664 and 1666 of the center housing 1610 can help to lift the journal bearing 1630 and the rotating assembly made up of the shaft 1602, the compressor wheel 1605 and the turbine wheel 1607. For example, given the multiple feed points for lubricant to the through bore of the center housing 1610, lubricant may be more evenly distributed and/or preferentially distributed to a lower region or regions as may be determined with respect to an orientation of the system 1600 with respect to gravity. Such an approach may facilitate lifting during start-up of an internal combustion engine that routes exhaust to the turbine housing 1606, particularly where ambient temperature may be low, making lubricant more viscous. As an example, lubricant may be pumped to the system 1600 via an electrically operated pump and/or via a mechanically operated pump. As an example, a lubricant pump may optionally be actuated prior to flow of exhaust to the turbine housing 1606 of the system 1600 where the lubricant may flow to the through bore of the center housing 1610 via the lubricant bores 1662, 1664 and 1666, for example, via the passage 1650 of the plate 1640 (e.g., and/or via a passage at an end of the center housing 1610, which may be sealed with a plate, etc.).

As shown in the example of FIG. 16C, the plate 1640 can include an inner bore or opening 1642, which may be sized to receive thrust forces from the journal bearing 1630, sized to cooperate with a thrust washer, etc. As an example, the plate 1640 can include an annular recess 1644 that can receive a seal element 1645 (e.g., a seal ring) such that a lubricant seal may be formed about an outer perimeter of the plate 1640 and an inner surface of a portion of the center housing 1610. In such an example, where lubricant may leak, leakage may be radially inwardly toward the opening 1642. As an example, a passage such as the passage 1650 may be sealed via a groove or grooves about the passage and a seal element or seal elements disposed in the groove or grooves. As an example, one or more seal features may be included on or in a center housing, for example, consider one or more grooves in a surface of the center housing 1610 that can receive at least in part one or more seal elements to form a seal or seals with respect to a passage that can communicate lubricant from one lubricant bore to one or more other lubricant bores.

As an example, efficiency of a squeeze film damper (SFD) can depend on lubricant flow (e.g., oil feed). For example, if a SFD is not adequately fed about an outer race of a bearing assembly, it's effectiveness as a vibration damper may be hindered. As an example, consider a scenario where lubricant may be viscous (e.g., cold start conditions, below 0 degrees C. ambient temperature, etc.). Where a turbocharger is to be operated with a viscous lubricant and/or in conditions where lubricant viscosity may be or become high, a turbocharger system can include one or more features that can provide for a more even distribution of lubricant about an outer race of a bearing assembly. As an example, one or more factors such as, for example, rotor weight, lubricant jet number, lubricant jet size, etc. may affect SFD effectiveness. As an example, a turbocharger system can include one or more features that can account for one or more of such factors.

As an example, a turbocharger system can include a housing that includes a through bore, a plurality of lubricant bores, a plurality of lubricant bore to through bore openings and a recessed compressor-side surface that defines in part a passage that fluidly couples at least two of the lubricant bores; a rolling element bearing unit disposed at least in part in the through bore of the housing; and a plate that covers at least a portion of the recessed compressor-side surface of the housing. In such an example, the plate can be a seal plate and/or a thrust plate (e.g., configured to receive thrust forces, for example, via an outer race of the rolling element bearing unit).

As an example, a plate can include a substantially flat surface (e.g., a substantially planar surface) that defines in part a passage that fluidly couples at least two lubricant bores. As an example, a recessed compressor-side surface of a housing can include a substantially flat surface (e.g., a substantially planar surface) that defines in part a passage that fluidly couples at least two lubricant bores.

As an example, a plate can include a groove that defines in part a passage that fluidly couples at least two lubricant bores. As an example, a recessed compressor-side surface of a housing can include a groove that defines in part a passage that fluidly couples at least two lubricant bores.

As an example, a turbocharger system can include an anti-rotation mechanism that includes a recess and a movable component disposed at least in part in the recess. In such an example, the movable component can include a flat, where a rolling element bearing unit can include an outer race that includes a flat and where contact between the flats limits rotation of the outer race in a through bore of a housing.

As an example, a through bore of a housing can include radial recesses where each of the radial recesses is defined in part by an azimuthal span about a longitudinal axis of the through bore.

As an example, in a turbocharger system, at least one of a plurality of lubricant bore to through bore openings of a housing can be formed by a radial recess that is defined in part by an azimuthal span about a longitudinal axis of a through bore of the housing.

As an example, a housing can include an upper half and a lower half and where at least one of a plurality of lubricant bores is disposed in the lower half. In such an example, the at least one lubricant bore may be in fluid communication with a passage that is in fluid communication with another lubricant bore where that other lubricant bore is a supply lubricant bore that supplies lubricant to a passage where the passage is in fluid communication with the at least one lubricant bore. As an example, a lower half of a turbocharger system may be defined as being oriented substantially downwardly with respect to Earth's gravity (e.g., under gravity, lubricant would flow toward the lower half).

As an example, a through bore of a housing can include a plurality of annular fluid chambers. In such an example, a rolling element bearing unit disposed at least in part in the through bore can include an outer race that includes surface portions disposed at an outer diameter and annular channels where the annular channels are positioned axially within the annular fluid chambers.

As an example, a through bore of a housing can include a plurality of annular fluid chambers. In such an example, a journal bearing disposed at least in part in the through bore can include outer surface portions disposed at an outer diameter and lubricant jet openings where the lubricant jet openings are positioned axially within the annular fluid chambers. As an example, such a journal bearing can include annular channels where the annular channels are positioned axially within the annular fluid chambers. In such an example, the annular channels may be in fluid communication with lubricant jets. For example, a lubricant jet opening may be disposed within an annular channel (e.g., annular groove) of a journal bearing.

As an example, a housing of a turbocharger system can include at least three lubricant bores. In such an example, a through bore of the housing can include at least three radial recesses where each of the radial recesses is defined in part by an azimuthal span about a longitudinal axis of the through bore.

As an example, a housing of a turbocharger system can include a housing that includes two lubricant bores and two radial recesses where each of the radial recesses is defined in part by an azimuthal span about a longitudinal axis of a through bore of the housing. In such an example, one of the radial recesses can include a greater azimuthal span than the other of the radial recesses. In such an example, the radial recess that includes the greater azimuthal span can be adjacent to a settling surface of the through bore that contacts a rolling element bearing unit in a rest state of the turbocharger system (e.g., or that contacts a journal bearing in a rest state of the turbocharger system). As an example, a rest state may be a state where exhaust flow to a turbine housing does not exist or is otherwise insufficient to cause a rotating assembly of a turbocharger system to rotate.

As an example, a turbocharger system can include a housing that includes a through bore, a plurality of lubricant bores, a plurality of lubricant bore to through bore openings and a recessed compressor-side surface that defines in part a passage that fluidly couples at least two of the lubricant bores; a journal bearing disposed at least in part in the through bore of the housing where the journal bearing includes opposing ends, two inner journal surfaces, a set of lubricant jets for each of the two inner journal surfaces and a drain opening disposed at an axial position between the sets of lubricant jets; and a plate that covers at least a portion of the recessed compressor-side surface of the housing. In such an example, the journal bearing can include an outer surface where the lubricant jets extend between the outer surface and an inner surface of the journal bearing where the inner surface may be an inner journal surface. For example, the journal bearing can include a compressor side inner journal surface and associated compressor side lubricant jets that can direct lubricant thereto and a turbine side inner journal surface and associated turbine side lubricant jets that can direct lubricant thereto. As an example, a lubricant film may be formed between an inner journal surface of a journal bearing and an outer surface of a shaft (e.g., a journal surface of a shaft). As an example, a lubricant film may be formed between an outer surface of a journal bearing and an inner surface of a through bore of a housing.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger system comprising:
   a housing that comprises a through bore, a plurality of lubricant bores, a plurality of lubricant bore to through bore openings, a plurality of annular fluid chambers, and a recessed compressor-side surface that defines in part a passage that fluidly couples at least two of the lubricant bores;
   a rolling element bearing unit disposed at least in part in the through bore of the housing, wherein the rolling element bearing unit comprises an outer race that comprises surface portions disposed at an outer diameter and annular channels wherein the annular channels are positioned axially within the annular fluid chambers; and
   a plate that covers at least a portion of the recessed compressor-side surface of the housing.

2. The turbocharger system of claim 1 wherein the plate comprises a thrust plate.

3. The turbocharger system of claim 1 wherein the plate comprises a seal plate.

4. The turbocharger system of claim 1 wherein the plate comprises a substantially flat surface that defines in part the passage.

5. The turbocharger system of claim 1 wherein the recessed compressor-side surface of the housing comprises a substantially flat surface that defines in part the passage.

6. The turbocharger system of claim 1 wherein the plate comprises a groove that defines in part the passage.

7. The turbocharger system of claim 1 wherein the recessed compressor-side surface of the housing comprises a groove that defines in part the passage.

8. The turbocharger system of claim 1 wherein the through bore comprises radial recesses wherein each of the radial recesses is defined in part by an azimuthal span about a longitudinal axis of the through bore.

9. The turbocharger system of claim 1 wherein at least one of the plurality of lubricant bore to through bore openings is formed by a radial recess that is defined in part by an azimuthal span about a longitudinal axis of the through bore.

10. The turbocharger system of claim 1 wherein the housing comprises an upper half and a lower half and wherein at least one of the plurality of lubricant bores is disposed in the lower half.

11. The turbocharger system of claim 10 wherein the lower half is oriented substantially downwardly with respect to Earth's gravity.

12. The turbocharger system of claim 1 wherein the plurality of lubricant bores of the housing comprises at least three lubricant bores.

13. The turbocharger system of claim 12 wherein the through bore of the housing comprises at least three radial recesses wherein each of the radial recesses is defined in part by an azimuthal span about a longitudinal axis of the through bore.

14. The turbocharger system of claim 1 wherein the plurality of lubricant bores of the housing comprises two lubricant bores and two radial recesses wherein each of the radial recesses is defined in part by an azimuthal span about a longitudinal axis of the through bore.

15. The turbocharger system of claim 14 wherein one of the radial recesses comprises a greater azimuthal span than the other of the radial recesses.

16. A turbocharger system comprising:
a housing that comprises a through bore, a plurality of lubricant bores, a plurality of lubricant bore to through bore openings and a recessed compressor-side surface that defines in part a passage that fluidly couples at least two of the lubricant bores;
a journal bearing disposed at least in part in the through bore of the housing wherein the journal bearing comprises opposing ends, two inner journal surfaces, a set of lubricant jets for each of the two inner journal surfaces and a drain opening disposed at an axial position between the sets of lubricant jets; and
a plate that covers at least a portion of the recessed compressor-side surface of the housing.

17. The turbocharger system of claim 16 wherein the housing comprises an upper half and a lower half and wherein at least one of the plurality of lubricant bores is disposed in the lower half.

18. The turbocharger system of claim 17 wherein the lower half is oriented substantially downwardly with respect to Earth's gravity.

19. The turbocharger system of claim 16 wherein the through bore comprises radial recesses wherein each of the radial recesses is defined in part by an azimuthal span about a longitudinal axis of the through bore.

20. The turbocharger system of claim 16 wherein at least one of the plurality of lubricant bore to through bore openings is formed by a radial recess that is defined in part by an azimuthal span about a longitudinal axis of the through bore.

* * * * *